United States Patent
Kim et al.

(10) Patent No.: US 9,467,551 B2
(45) Date of Patent: Oct. 11, 2016

(54) MOBILE TERMINAL AND METHOD OF CONTROLLING THEREFOR

(71) Applicant: LG ELECTRONICS INC., Seoul (KR)

(72) Inventors: Hyunkyu Kim, Seoul (KR); Yoosang Won, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/598,992

(22) Filed: Jan. 16, 2015

(65) Prior Publication Data

US 2015/0222741 A1   Aug. 6, 2015

(30) Foreign Application Priority Data

Feb. 5, 2014   (KR) .................. 10-2014-0013079

(51) Int. Cl.
*H04W 4/12*   (2009.01)
*H04M 1/725*   (2006.01)

(52) U.S. Cl.
CPC .......... *H04M 1/72555* (2013.01); *H04W 4/12* (2013.01); *H04M 2250/22* (2013.01)

(58) Field of Classification Search
CPC ....... H04W 4/12; H04M 1/725; G06Q 30/02
USPC ....... 455/414.1, 566, 145, 158.4–5; 345/618, 345/619; 715/810, 835, 838
See application file for complete search history.

(56) References Cited

U.S. PATENT DOCUMENTS

| | | | |
|---|---|---|---|
| 2002/0025084 A1* | 2/2002 | Yang .................. | G06F 3/14 382/299 |
| 2004/0056981 A1* | 3/2004 | Hamamura ........ | H04N 1/00453 348/578 |
| 2005/0153740 A1* | 7/2005 | Binzel ................ | H04M 1/2745 455/558 |
| 2011/0119625 A1* | 5/2011 | Moon ................. | G06F 3/048 715/810 |
| 2011/0310039 A1* | 12/2011 | Kim .................... | G06F 3/0481 345/173 |
| 2012/0099000 A1* | 4/2012 | Kim .................... | H04N 1/3871 348/231.99 |
| 2013/0024805 A1* | 1/2013 | In ....................... | G11B 27/34 715/781 |
| 2013/0212518 A1* | 8/2013 | Han ................... | G06K 7/10346 715/780 |
| 2014/0040828 A1* | 2/2014 | Choi ................... | G11B 27/34 715/835 |

FOREIGN PATENT DOCUMENTS

JP              04070912 A   *   3/2004

* cited by examiner

*Primary Examiner* — Cong Tran
(74) *Attorney, Agent, or Firm* — KED & Associates LLP

(57) ABSTRACT

The present invention relates to a mobile terminal enabling a user to more conveniently use the terminal and a method of controlling therefor. According to at least one of embodiments of the present invention, it is able to provide a user with a control method capable of easily and efficiently sharing an image with a different mobile terminal using tag information which is stored together with the image.

14 Claims, 28 Drawing Sheets

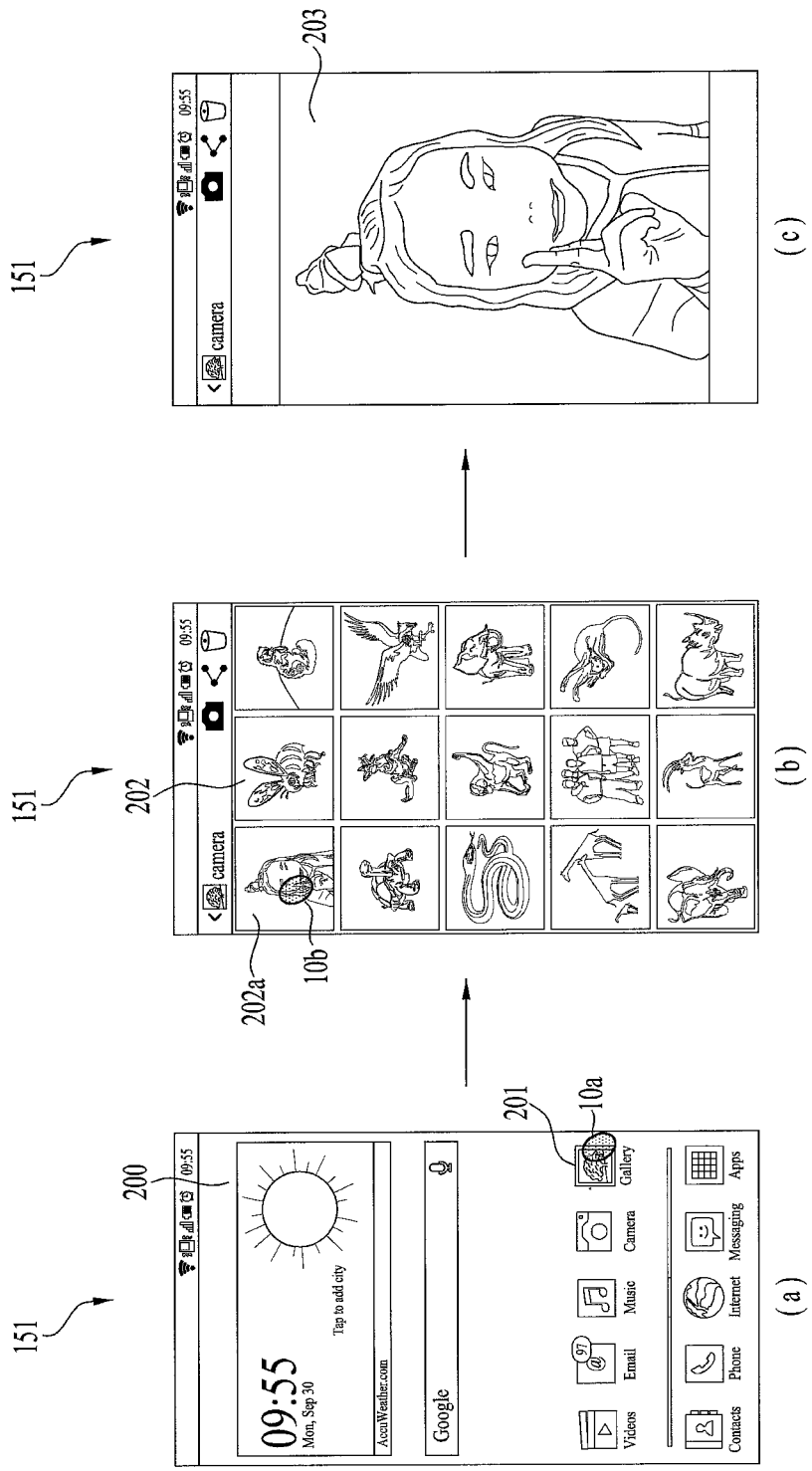

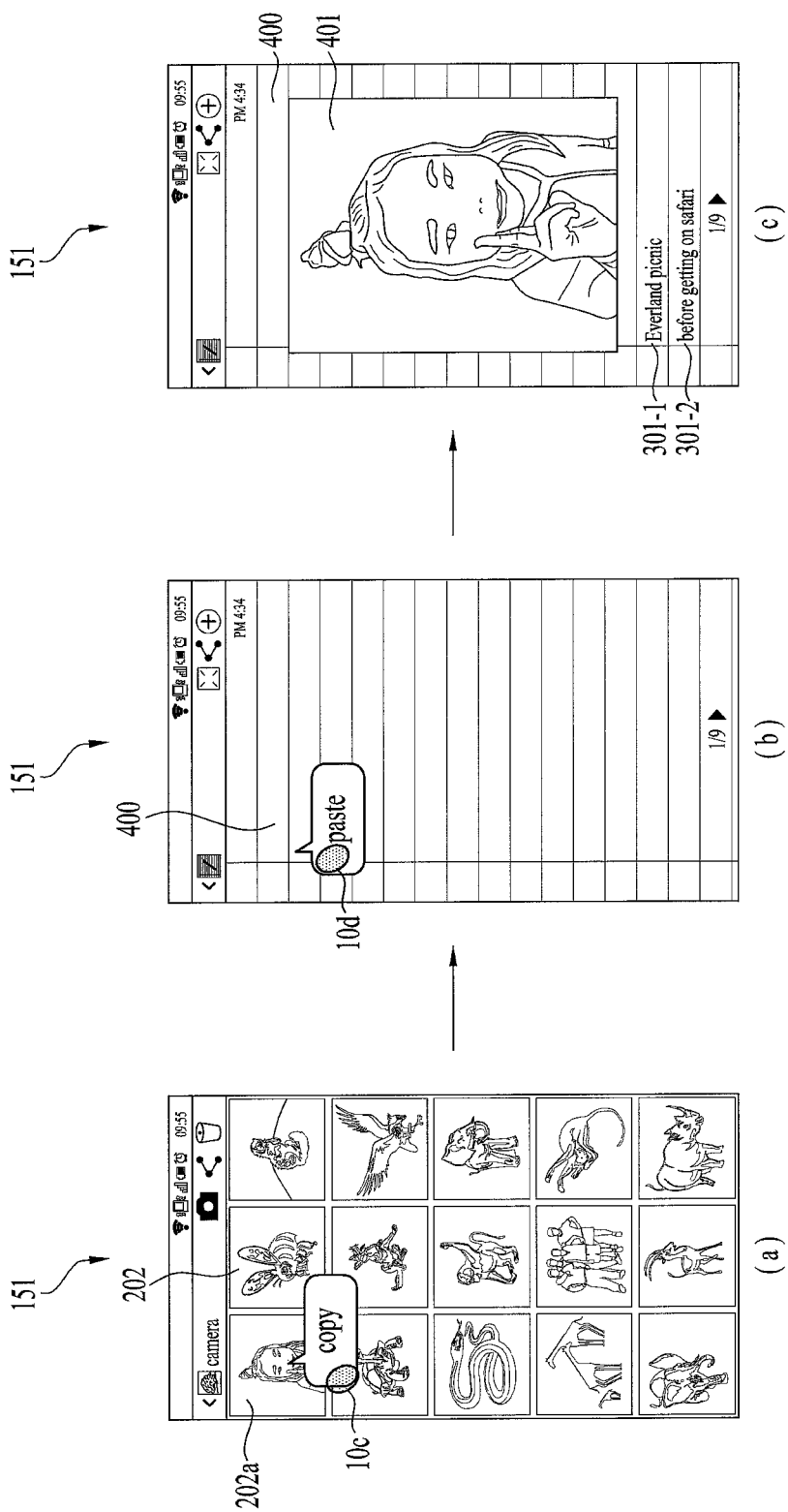

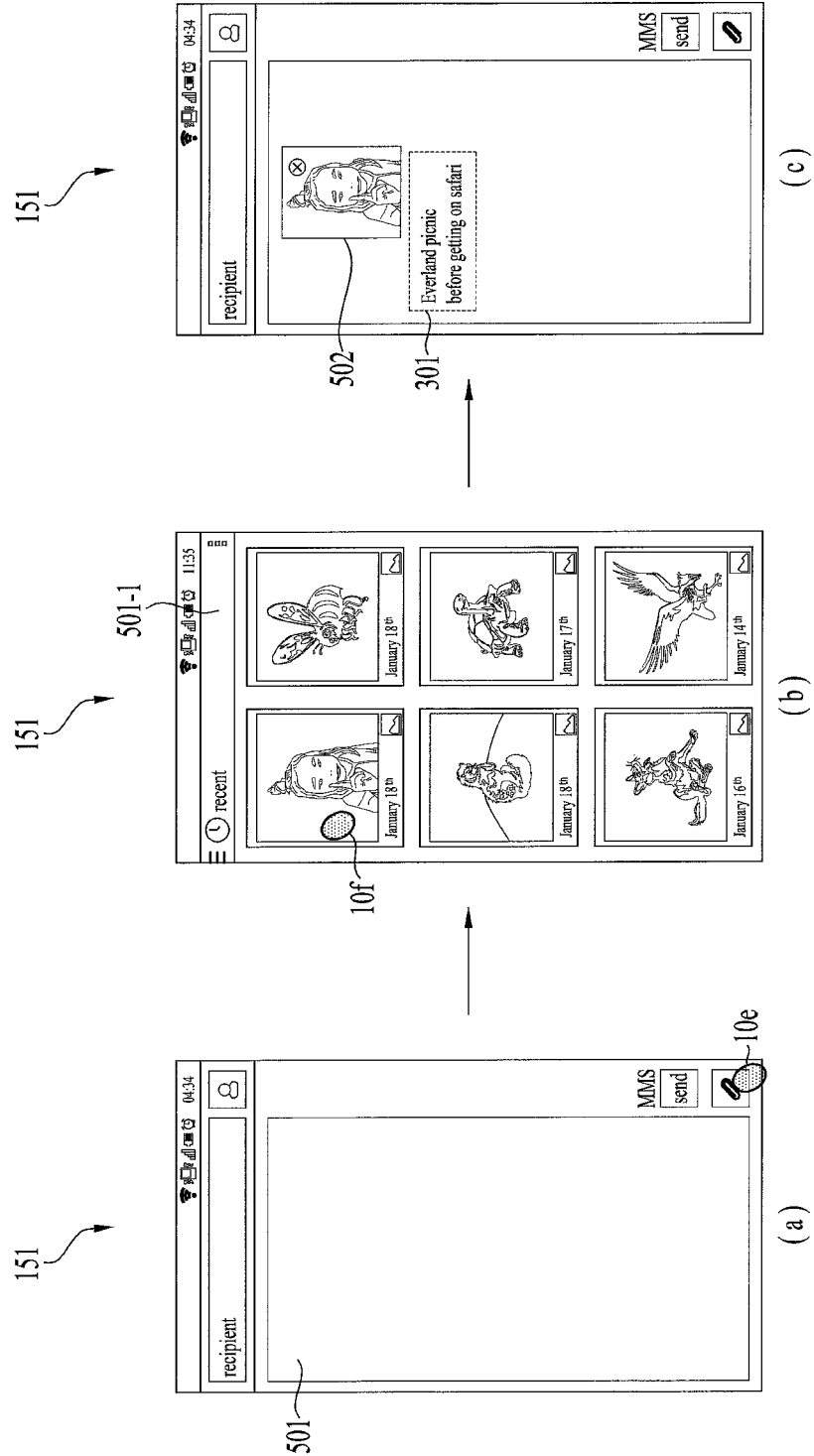

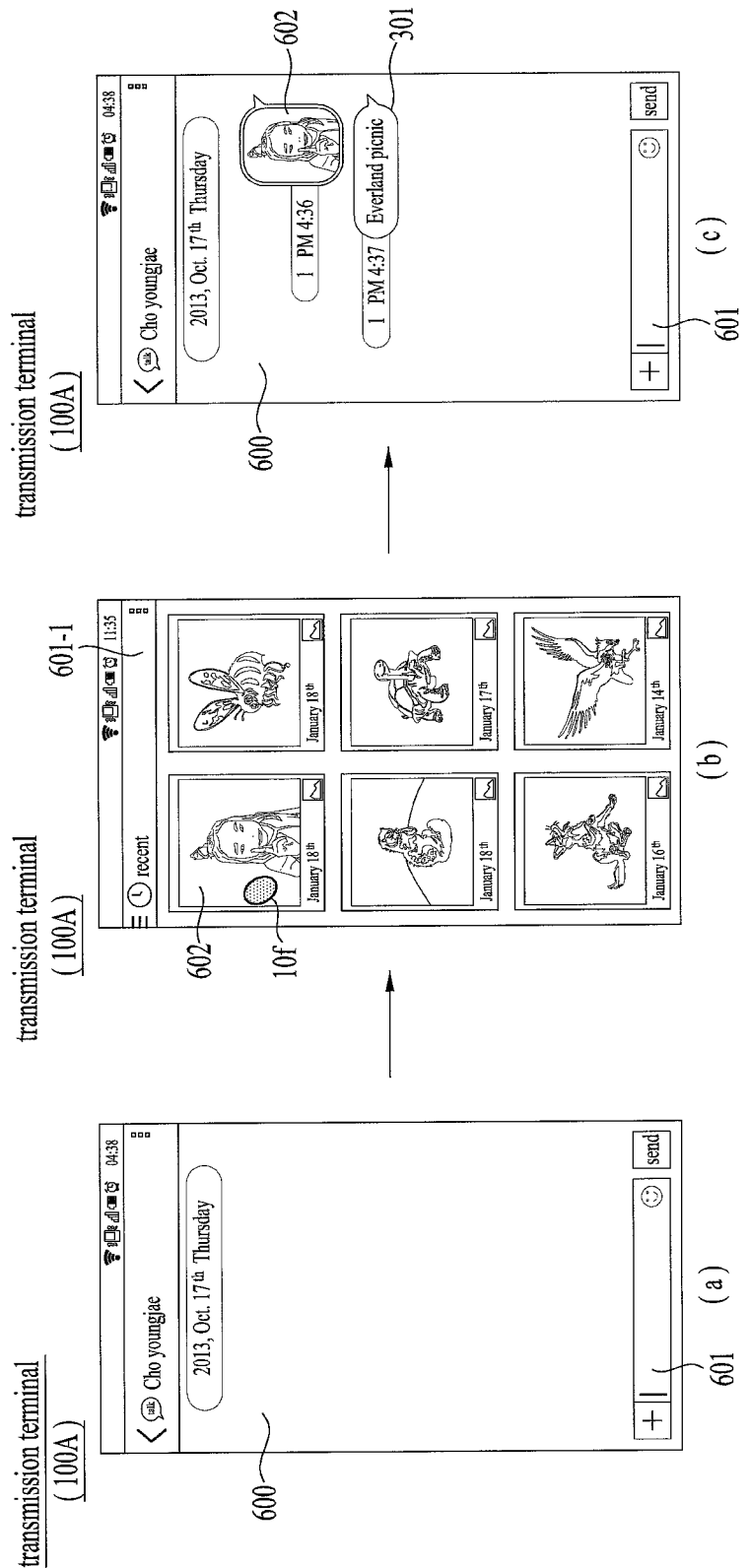

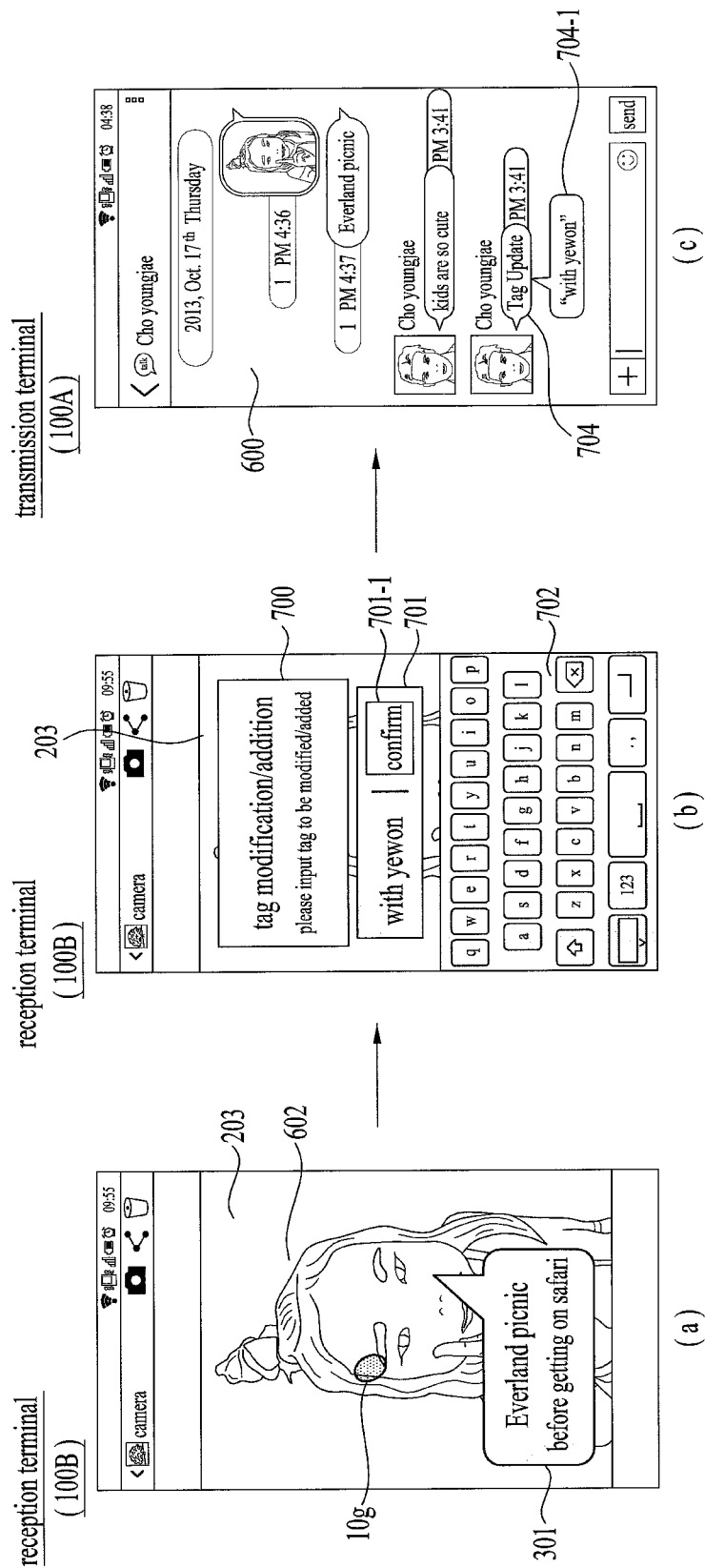

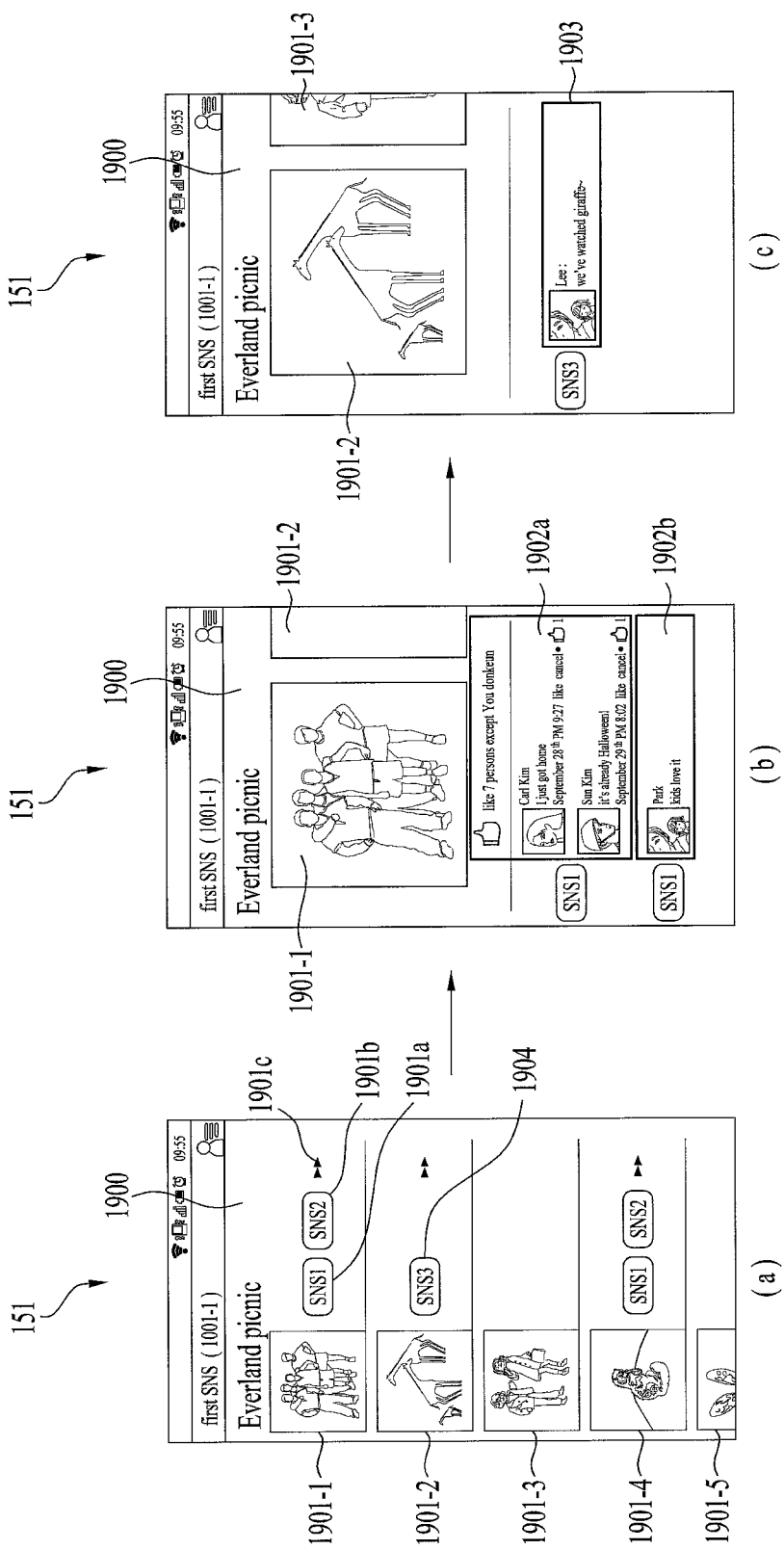

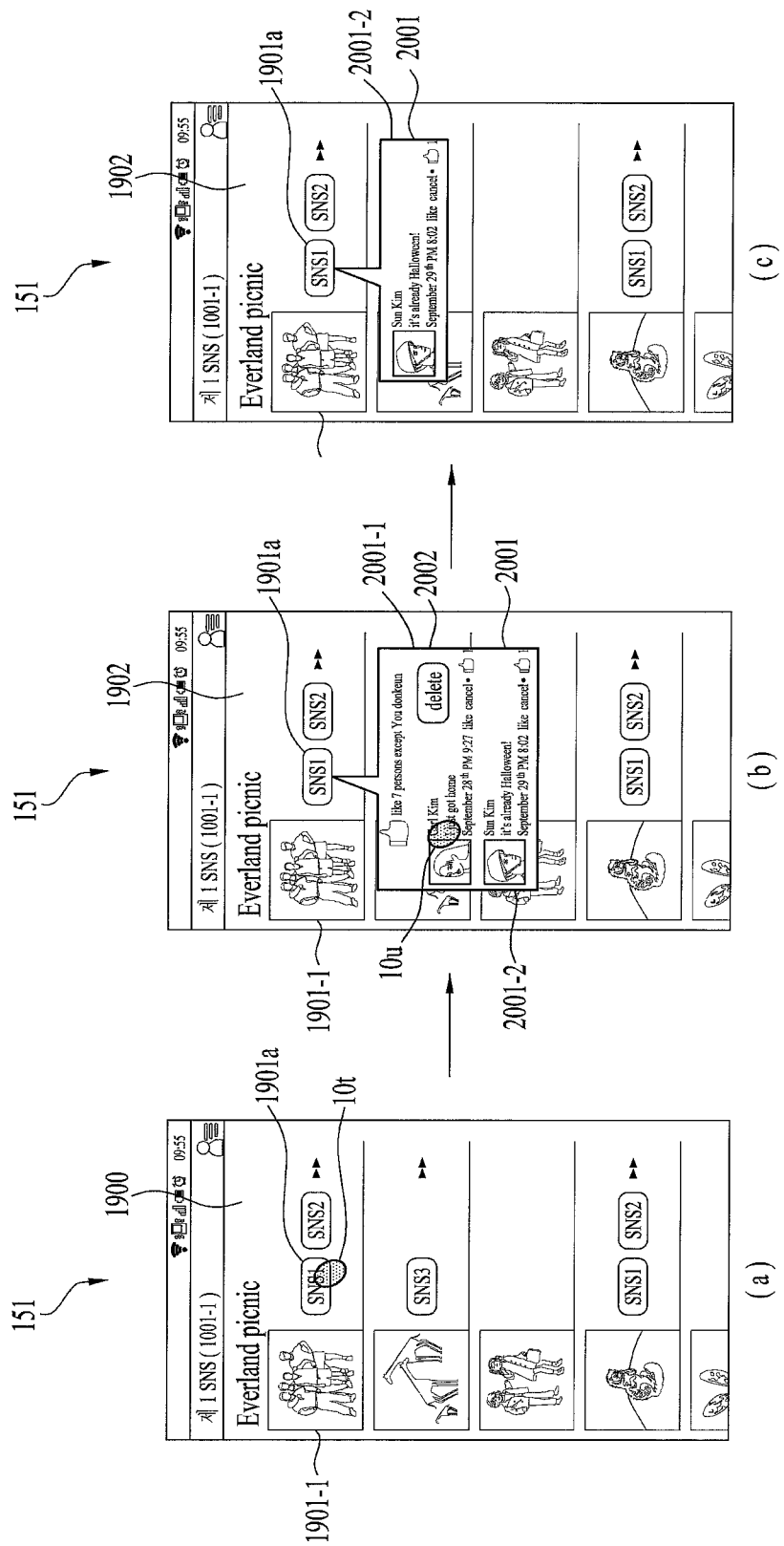

MOBILE TERMINAL AND METHOD OF CONTROLLING THEREFOR

CROSS-REFERENCE TO RELATED APPLICATION(S)

Pursuant to 35 U.S.C. §119(a), this application claims the benefit of earlier filing date and right of priority to Korean Application No. 10-2014-0013079, filed on Feb. 5, 2014, the contents of which are hereby incorporated by reference herein in their entirety.

BACKGROUND

1. Field

The present invention relates to a mobile terminal enabling a user to more conveniently use the terminal and a method of controlling therefor.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a picture is captured and recorded by a mobile terminal and the picture is shared with others via SNS (social network service) and the like. This sort of picture-sharing has become a new culture nowadays. Since a user records a daily life or travel notes of the user together with pictures and shares them with others, the number of images shared with others is not small.

Although the large numbers of images are shared by the SNS and the like, controlling methods capable of efficiently sharing the images are not developing. In particular, since a type of an SNS becomes more and more diversified, it is very difficult to read and/or manage many kinds of SNSs across the board. Hence, it is required to have a controlling method capable of supplementing the drawbacks.

SUMMARY OF THE INVENTION

Accordingly, the present invention is directed to an apparatus and method thereof that substantially obviate one or more problems due to limitations and disadvantages of the related art. An object of the present invention is to provide a mobile terminal enabling a user to more easily share an image using tag information of the image and a method of controlling therefor.

Another object of the present invention is to provide a mobile terminal enabling a user to read postings written for a specific image at a time in various kinds of SNSs and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes a touch screen, a memory configured to store at least one or more images and tag information respectively corresponding to the at least one or more images and a controller configured to execute a message transmission and reception application capable of transceiving data with a counterpart terminal, the controller configured to control the touch screen to output a message input window, which is used for inputting a transmitted message, via the message transmission and reception application, the controller, if an image attachment command is received on a prescribed image, configured to input tag information corresponding to the prescribed image to the message input window.

In this case, if the image attachment command is received on the prescribed image, the controller can transmit the prescribed image and the tag information corresponding to the prescribed image to the counterpart terminal.

The controller controls the touch screen to further output a transmission and reception message output window to output transmitted and received messages and can further output the transmitted tag information in the transmission and reception message output window.

The controller can further output a thumbnail image corresponding to the transmitted image in the transmission and reception message output window.

If update information modifying the transmitted tag information is received from the counterpart terminal, the controller can modify the stored tag information based on the update information.

The controller controls the touch screen to further output a transmission and reception message output window to output transmitted and received messages and can control the received update information to be outputted in the transmission and reception message output window.

The controller controls the touch screen to output an image list consisting of thumbnail images respectively corresponding to the at least one or more images stored in the memory and if a tag output command is received on a prescribed image, the controller can output tag information corresponding to the prescribed image in the image list.

In this case, the tag information can include at least one item selected from the group consisting of a title, a memo, a time and a location.

The controller controls the touch screen to further output a transmission and reception message output window to output transmitted and received messages and if a prescribed touch gesture is inputted on a received message outputted in the transmission and reception message output window, the controller can store the received message as tag information on a prescribed image.

In this case, the prescribed touch gesture may correspond to an input touching the received message outputted in the transmission and reception message output window, dragging the received message to a prescribed image outputted in the transmission and reception message output window while the touch is maintained and dropping the received message to the prescribed image.

To further achieve these objects and other advantages and in accordance with the purpose of the invention, as embodied and broadly described herein, according to a different embodiment, a method of controlling a mobile terminal, which includes a touch screen and a memory configured to store at least one or more images and tag information respectively corresponding to the at least one or more images, includes the steps of executing a message transmission and reception application capable of transceiving data with a counterpart terminal, controlling the touch screen to output a message input window, which is used for inputting a transmitted message, via the message transmission and reception application and if an image attachment command is received on a prescribed image, inputting tag information corresponding to the prescribed image to the message input window.

If the image attachment command is received on the prescribed image, the method can include the step of transmitting the prescribed image and the tag information corresponding to the prescribed image to the counterpart terminal.

The touch screen controlling step can further include the steps of further outputting a transmission and reception message output window to output transmitted and received messages and further outputting the transmitted tag information in the transmission and reception message output window.

The touch screen controlling step can further include the steps of further outputting a thumbnail image corresponding to the transmitted image in the transmission and reception message output window.

If update information modifying the transmitted tag information is received from the counterpart terminal, the method can further include the step of modifying the stored tag information based on the update information.

The touch screen controlling step can further include the steps of further outputting a transmission and reception message output window to output transmitted and received messages and outputting the received update information in the transmission and reception message output window.

The touch screen controlling step can further include the steps of outputting an image list consisting of thumbnail images respectively corresponding to the at least one or more images stored in the memory and if a tag output command for a prescribed image is received, outputting tag information corresponding to the prescribed image in the image list.

In this case, the tag information can include at least one item selected from the group consisting of a title, a memo, a time and a location.

The touch screen controlling step can further include the steps of further outputting a transmission and reception message output window to output transmitted and received messages and if a prescribed touch gesture is inputted on a received message outputted in the transmission and reception message output window, storing the received message as tag information on a prescribed image.

The prescribed touch gesture may correspond to an input touching the received message outputted in the transmission and reception message output window, dragging the received message to a prescribed image outputted in the transmission and reception message output window while the touch is maintained and dropping the received message to the prescribed image.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein:

FIG. 2 is a conceptual diagram for explaining an example of transforming a mobile terminal 200 according to the present invention;

FIG. 4A is a diagram for a control method copying tag information together when an image is copied according to one embodiment of the present invention;

FIG. 5 is a diagram for a control method attaching tag information and an image to a message to be transmitted in case of writing the message using a text message application according to one embodiment of the present invention;

FIG. 6A is a diagram for a control method attaching tag information and an image to a message to be transmitted in case of writing the message using an SNS application according to one embodiment of the present invention;

FIG. 7 is a diagram for a control method modifying received tag information by a mobile terminal, which has received the tag information, according to one embodiment of the present invention;

FIGS. 19 and 20 are diagrams for a control method interworking a posting of an SNS application related to an image according to one embodiment of the present invention;

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the description only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like. However, it is apparent to those skilled in the art that a configuration according to an embodiment disclosed in this specification is applicable to such a fixed terminal as a digital TV, a desktop computer and the like as well as a mobile terminal.

Figure 1A:
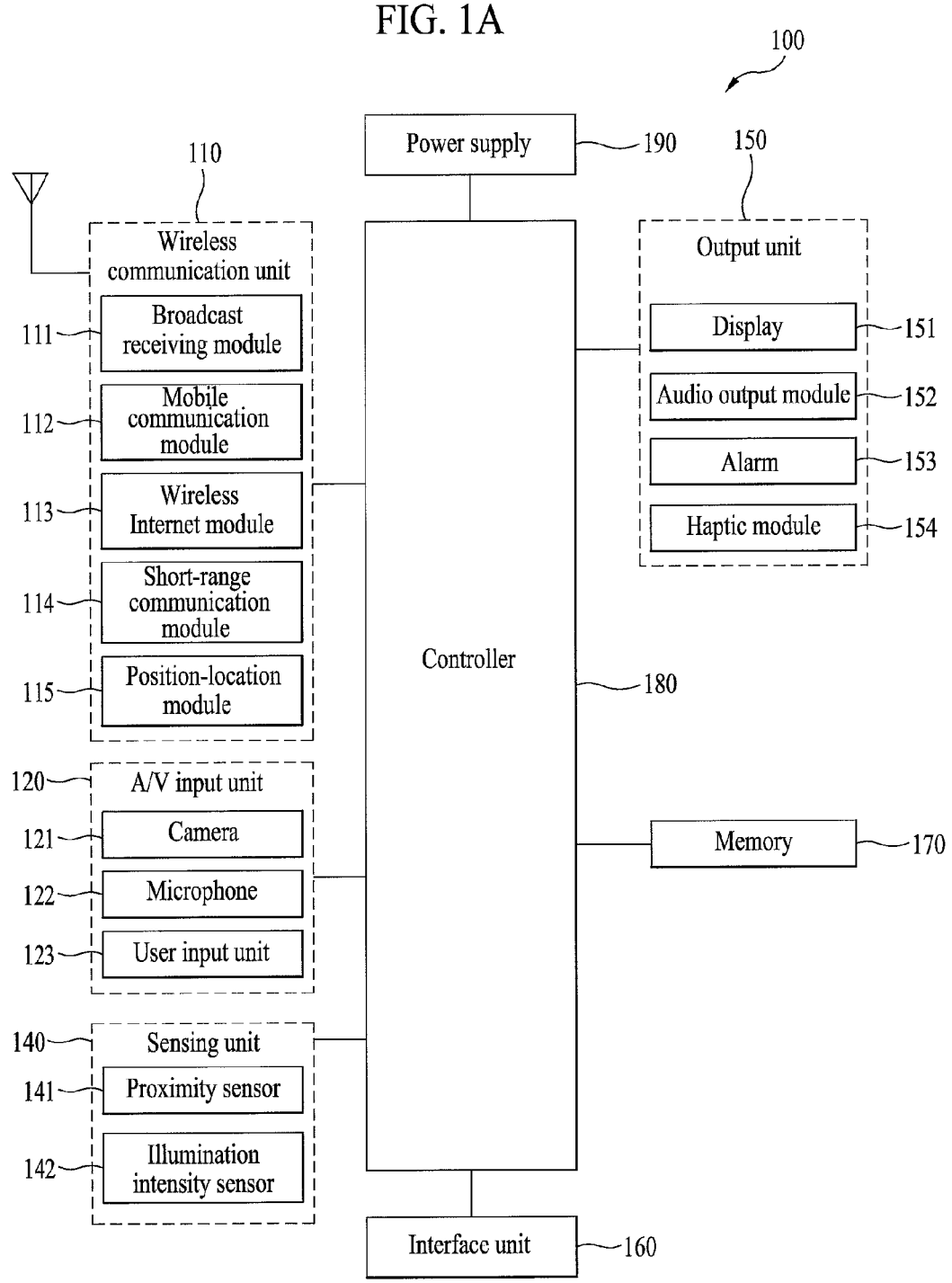
FIG. 1A is a block diagram illustrating a mobile terminal according to one embodiment of the present invention.

FIG. 1A is a block diagram of a mobile terminal 100 in accordance with an embodiment of the present invention. FIG. 1A shows the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1A shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. In a non-limiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-information module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1A, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode.

The microphone 122 typically includes assorted noise removing algorithms to remove noise generated in the course of receiving the external audio signal.

The user input unit 130 generates input data responsive to user manipulation of an associated input device or devices. Examples of such devices include a button provided to front/rear/lateral side of the mobile terminal 100 and a touch sensor (constant pressure/electrostatic) and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor configures a mutual layer structure (hereinafter called 'touch screen'), the display 151 can be used as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor can be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 1B:
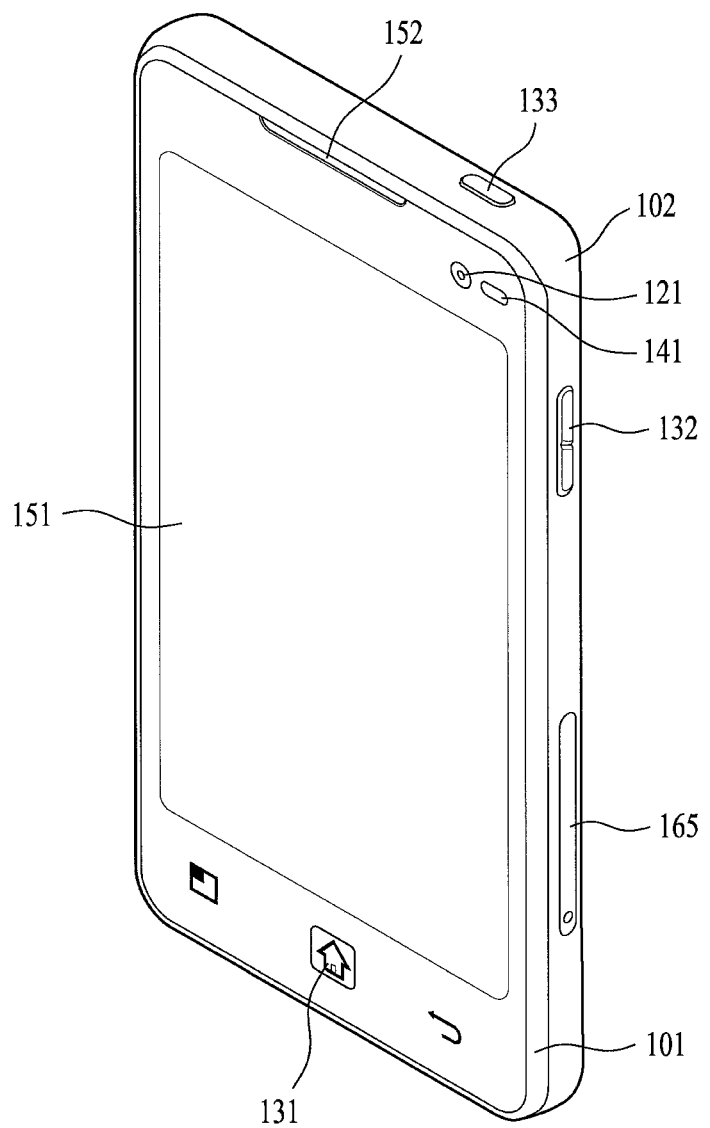
FIGS. 1B and 1C are front and rear perspective diagrams of a mobile terminal according to one embodiment of the present invention.

Referring to FIG. 1B, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm 153 is output a signal for announcing the occurrence of a particular event associated with the mobile terminal 100. Typical events include a call received event, a message received event and a touch input received event. The alarm 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

A projector module 155 can also be included for projecting images stored in the memory 160, externally received etc. The projector module 155 can also be rotated so as to project images in different directions.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output for a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 1B is a front perspective diagram of a mobile terminal according to one embodiment of the present invention. The mobile terminal 100 shown in the drawing has a bar type terminal body, however, the mobile terminal 100 may be implemented in a variety of different configurations. Examples of such configurations include folder-type, slide-type, rotational-type, swing-type and combinations thereof. For clarity, the following description will primarily relate to a bar-type mobile terminal 100. However such teachings apply equally to other types of mobile terminals.

Referring to FIG. 1B, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Electronic components can be mounted on a surface of the rear case 102. The electronic part mounted on the surface of the rear case 102 may include such a detachable part as a battery, a USIM card, a memory card and the like. Thus, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Figure 1C:
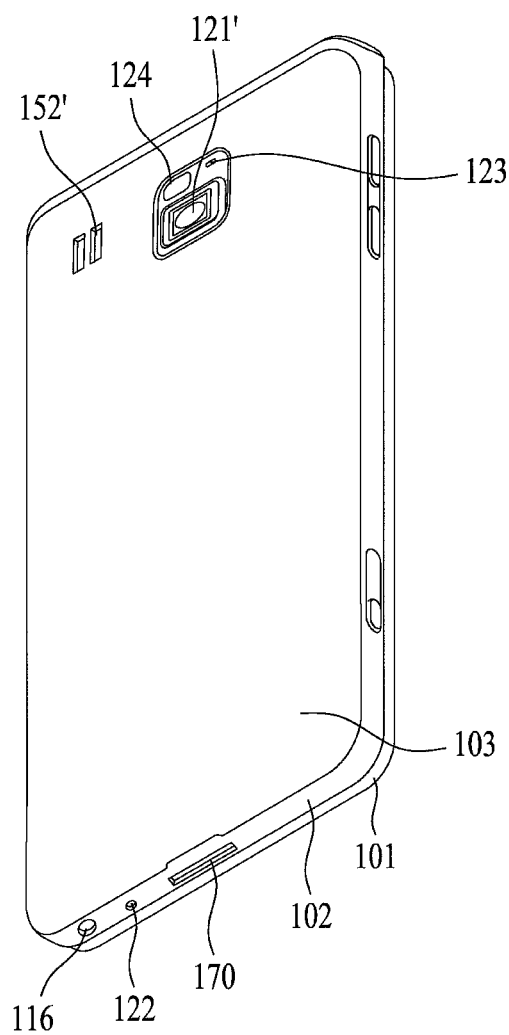

Referring to FIGS. 1B and 1C, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening configured to expose a camera 121' or an audio output unit 152' externally. The cases 101, 102 and 103 are formed by injection molding of synthetic resin or can be formed of metal substance such as stainless steel (STS), titanium (Ti) or the like for example.

A display 151, an audio output unit 152, a camera 121, user input units 130 (131, 132 and 133), a microphone 122, an interface 180 and the like can be provided to the case 101 or 102. The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131, 132 and 133. The manipulating units 131, 132 and 133 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the manipulating unit 133.

Figure 3:
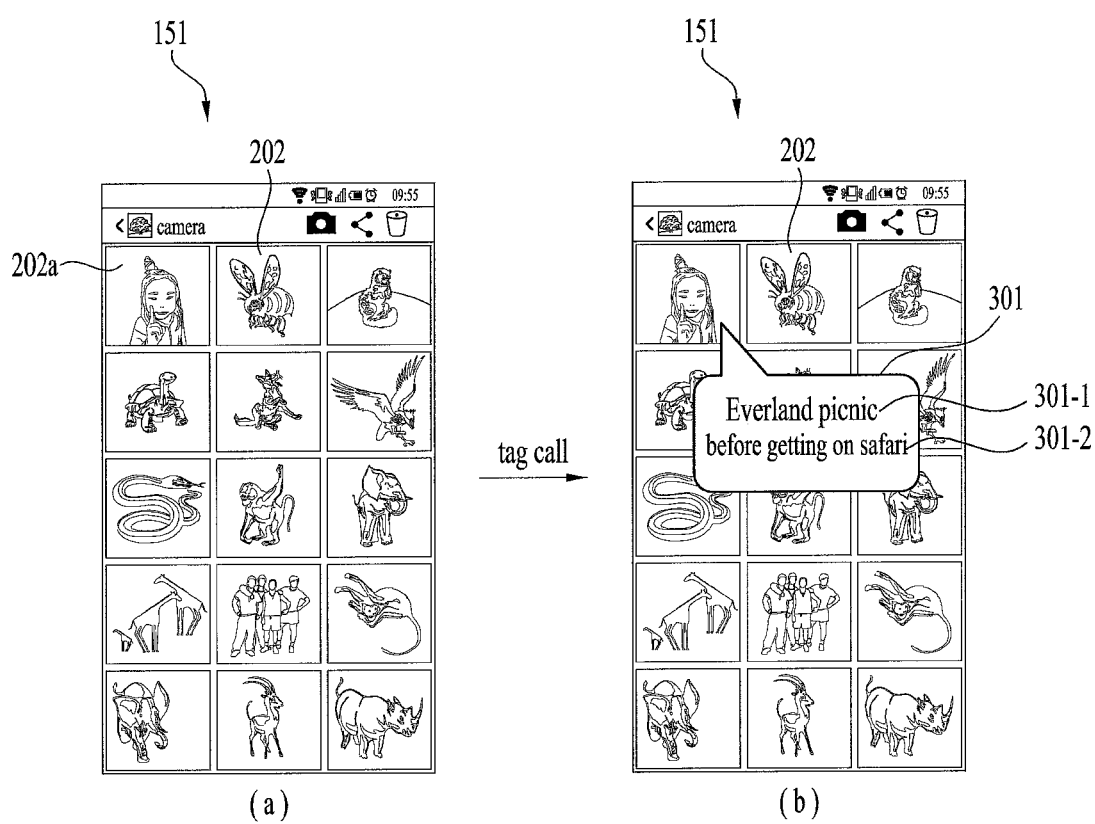
FIG. 3 is a diagram for a control method reading tag information on a thumbnail list according to one embodiment of the present invention.

FIG. 1C is a perspective diagram of a backside of the terminal shown in FIG. 3. Referring to FIG. 3, a camera 121' can be additionally provided to a backside of the terminal body, and more particularly, to the rear case 102. The camera 121' has a photographing direction that is substantially opposite to that of the camera 121 shown in FIG. 1B and may have pixels differing from those of the camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view their face reflected by the mirror 124.

An additional audio output unit 152' can be provided to the backside of the terminal body. The additional audio output unit 152' can implement a stereo function together with the former audio output unit 152 shown in FIG. 1B and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1A can be retractably provided to the terminal body.

FIG. 2 is a conceptual diagram for explaining an example of transforming a mobile terminal 200 according to the present invention.

As shown in FIG. 2, a display unit 251 can be configured to be transformed by an external force. The transformation of the display unit 251 may correspond to at least one selected from the group consisting of bending, folding, twisting and rolling. The transformable display unit 251 can be called a 'flexible display unit'. In this case, the flexible display unit 251 can include both a general flexible display and E-paper.

The general flexible display is manufactured on the top of such a thin and flexible panel capable of being bent, folded, twisted or rolled as a paper while maintaining a characteristic of a conventional flat panel display. Hence, the flexible display may correspond to a light and infrangible display.

The E-paper is a display technology to which a characteristic of a normal ink is applied. Unlike a conventional flat panel display, the E-paper uses reflected light. The E-paper can change information using a twist ball or electrophoresis that uses a capsule.

In a state that the flexible display unit 251 is not transformed (e.g., a state of having an infinite bending radius, hereinafter called a first state), a display area of the flexible display unit 251 becomes a flat surface. If the first state changes to a transformed state (e.g., a state of having a finite bending radius, hereinafter called a second state) by an external force, the display area may become a curved surface. As shown in the drawing, information displayed in the second state may become visual information outputted on the curved surface. The visual information can be implemented by independently controlling light-emitting of a sub-pixel which is arranged in a matrix form. The sub-pixel may indicate a minimum unit required to implement a single color.

The flexible display unit 251 may become a state of being bent (e.g., a state of being bent up and down or left and right) instead of the first state. In this case, if an external force is applied to the flexible display unit 251, the flexible display unit 251 can be transformed to a flat state or a state of being more bent.

Meanwhile, the flexible display unit 251 can implement a flexible touch screen in a manner of being combined with a touch sensor. If a touch is inputted on the flexible touch screen, a controller 180 (refer to FIG. 1a) can perform a control in response to the touch input. The flexible touch screen can be configured to detect a touch input in the second state as well as the first state.

Meanwhile, a transformation detection means capable of detecting a transformation of the flexible display unit 251 can be installed in a mobile terminal 200 according to the present transformation example. The transformation detection means can be included in a sensing unit 140 (refer to FIG. 1a).

The transformation detection means is installed in the flexible display unit 251 or a case 201 and can detect information related to the transformation of the flexible display unit 251. In this case, the information related to the transformation of the flexible display unit may correspond to a direction to which the flexible display unit 251 is transformed, the extent of transformation, a position of transformation, time of transformation, restoration acceleration of the transformed flexible display unit 251 and the like. Besides, the information related to the transformation of the flexible display unit may correspond to various informations capable of being detected by bending of the flexible display unit 251.

The controller 180 can change information displayed on the flexible display unit 251 or generate a control signal configured to control a function of the mobile terminal 200 based on the information related to the transformation of the flexible display unit 251 which is detected by the transformation detection means.

Meanwhile, the mobile terminal 200 according to the present transformation example can include a case 201 storing the flexible display unit 251. The case 201 can be configured to be transformed together with the flexible display unit 251 by an external force in consideration of a characteristic of the flexible display unit 251.

Moreover, a battery (not depicted) mounted on the mobile terminal 200 can also be configured to be transformed together with the flexible display unit 251 by an external force in consideration of the characteristic of the flexible display unit 251. In order to implement the battery, a stack and folding scheme, which piles up battery cells, can be applied.

In the following, embodiments, which are related to a controlling method capable of being implemented in the aforementioned mobile terminal, are explained with reference to attached drawings.

One embodiment of the present invention proposes a control method enabling a user to more efficiently and easily share images stored in the mobile terminal 100 with other persons. To this end, according to one embodiment of the present invention, prescribed information is stored in a metadata form of an image and then the prescribed information is used. Prescribed information corresponding to an image can be called tag information of the image.

In general, tag information is used to record a simple explanation on an image. One embodiment of the present invention proposes a control method capable of not only performing a record but also efficiently sharing an image by using the tag information.

Moreover, one embodiment of the present invention proposes a control method capable of efficiently reading a posting related to an image shared with a user of a different mobile terminal via SNS (social network service), a text message or the like.

First of all, prior to explaining the aforementioned embodiments, a method of reading an image stored in the mobile terminal 100 is explained with reference to FIG. 2.

FIG. 2 is a diagram for a screen on which an image list and images are outputted by executing a gallery application according to one embodiment of the present invention.

One embodiment of the present invention explained in the following shows a screen configured to read an image using a gallery application, by which the present invention may be non-limited. If an application and/or a control method are able to output an image, the application and/or the control method may correspond to one embodiment of the present invention.

Referring to FIG. 2 (*a*), it shows a state of a mobile terminal 100 outputting a home screen 200. Meanwhile, a case forming an exterior of the mobile terminal is omitted at this time for clarity. Instead, a state of outputting a screen outputted by a touch screen 151 is depicted only.

As shown in FIG. 2 (*a*), if an input selecting a gallery application execution icon 201, which is included in the home screen 200, is received, the controller 180 executes a gallery application and can output an execution screen (FIG. 2 (*b*)). As shown in FIG. 2 (*b*), the execution screen of the gallery application can include an image list 202 (hereinafter called thumbnail list) consisting of thumbnail images respectively corresponding to images stored in the mobile terminal 100.

If an input selecting one thumbnail image 202*a* from the thumbnail list 202 is received, as shown in FIG. 2 (*c*), the controller 180 can control an image 203 corresponding to the selected thumbnail image 202*a* to be outputted.

Meanwhile, according to one embodiment of the present invention, it is able to check tag information stored in each image on the thumbnail list 202. Regarding this, it shall be described with reference to FIG. 3 in the following.

FIG. 3 is a diagram for a control method reading tag information on a thumbnail list according to one embodiment of the present invention.

Referring to FIG. 3 (*a*), the controller 180 outputs a thumbnail list 202 via a touch screen 151. If a tag call command for a prescribed image is received, the controller 180 can output stored tag information 301 in response to the prescribed image (refer to FIG. 3 (*b*)). In this case, as an example, the tag call command may correspond to an input touching a thumbnail image 202*a* corresponding to the prescribed image and maintaining the touch for more than a prescribed time.

Meanwhile, according to one embodiment of the present invention, in storing tag information, the tag information is classified into a plurality of items and the tag information is stored according to the classified items. For instance, according to one embodiment of the present invention, the tag information including at least one selected from the group consisting of 'title', 'memo', 'time' and 'location' can be stored. In case of using the tag information, the tag information can be used item by item. Regarding a control method using the stored tag item by item, it shall be explained in detail later.

As shown in FIG. 3 (*b*), tag information 301 can include a first item tag 301-1 corresponding to a first item and a second item tag 301-2 corresponding to a second item. For instance, the first item is stored by a 'title' item and the corresponding first item tag 301-1 is stored by 'Everland picnic'.

In the following description, a control method sharing an image in a manner of utilizing the tag information is explained with reference to FIG. 4A to FIG. 6.

Figure 4B:
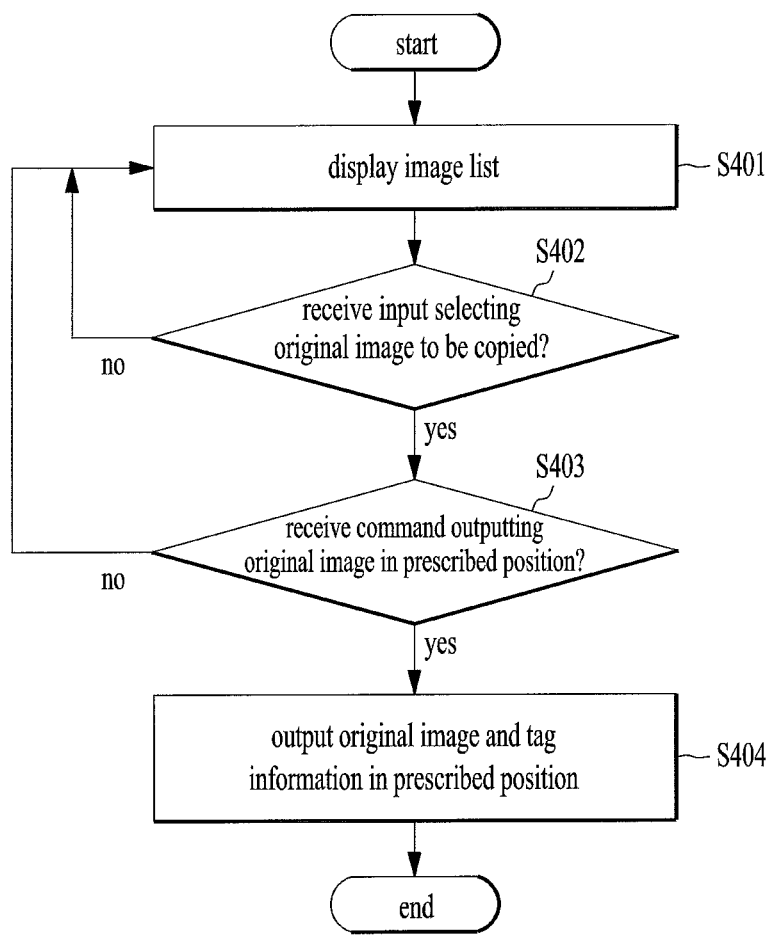
FIG. 4B is a flowchart for a control method copying tag information together when an image is copied according to one embodiment of the present invention.

FIG. 4A is a diagram for a control method copying tag information together when an image is copied according to one embodiment of the present invention. FIG. 4B is a flowchart for a control method copying tag information together when an image is copied according to one embodiment of the present invention. In the following, the control method is explained with reference to FIG. 4A and FIG. 4B.

In the step S401, the controller 180 displays a list of images. In this case, as shown in FIG. 4A (a), the image list may correspond to a thumbnail list 202. In the step S402, the controller 180 receives an input selecting an original image to be copied. Copying an image means to specify a prescribed image to use the image in a different application and output the specified image in the different application. In the following description, in explaining one embodiment of the present invention, an operation of specifying a prescribed image is called a copy for the prescribed image and an operation of outputting the prescribed image on a prescribed position of a different application is called a paste. In the step of copying, the controller 180 temporarily/permanently stores the specified image in a memory 170 and may be then able to use the stored image. In particular, in the step of S402, the input selecting the original image to be copied may mean to copy the image as an operation of specifying the original image.

Referring to FIG. 4A (b), the controller 180 outputs an execution screen 400 of a memo application. In the step S403, the controller determines whether a command (paste command) 10*d* outputting the original image in a prescribed position of the execution screen 400 of the memo application is received. If the command is not received, it may return to the step S401. If the command is received, it may proceed to the step S404. If the paste command 10*d* is received, the controller 180 outputs the original image specified by the copy and tag information 301-1/301-2 of the original image in the prescribed position.

If the tag information of the original image is classified into a plurality of items, as show in FIG. 4A (c), a first item tag 301-1 and a second item tag 301-2 can be displayed together.

Although the embodiment explained with reference to FIG. 4 is described with an example of the memo application, the embodiment can also be applied in case of executing a text message transmission and reception application (hereinafter text message application) shown in FIG. 5.

FIG. 5 is a diagram for a control method attaching tag information and an image to a message to be transmitted in case of writing the message using a text message application according to one embodiment of the present invention.

FIG. 5 (*a*) shows a message input window 501 to transmit a text message using a text message application. If an image attachment command 10*e* is received on the message input window 501, as shown in FIG. 5 (*b*), the controller 180 can display an image list 501-1 to receive a selection of an image to be attached. If one image is selected from the image list 501-1, the controller 180 can attach the selected image 502 and tag information 301 corresponding to the selected image 502 to the message input window 501. In this case, in case of attaching the tag information 301 to the message input window, the controller 180 can input the tag information in a text data form of the message input window 501 instead of a simple metadata form of the image. The attached image 502 and the tag information 301 can be transmitted to a counterpart terminal together with an inputted message in response to a transmission command.

Figure 6B:
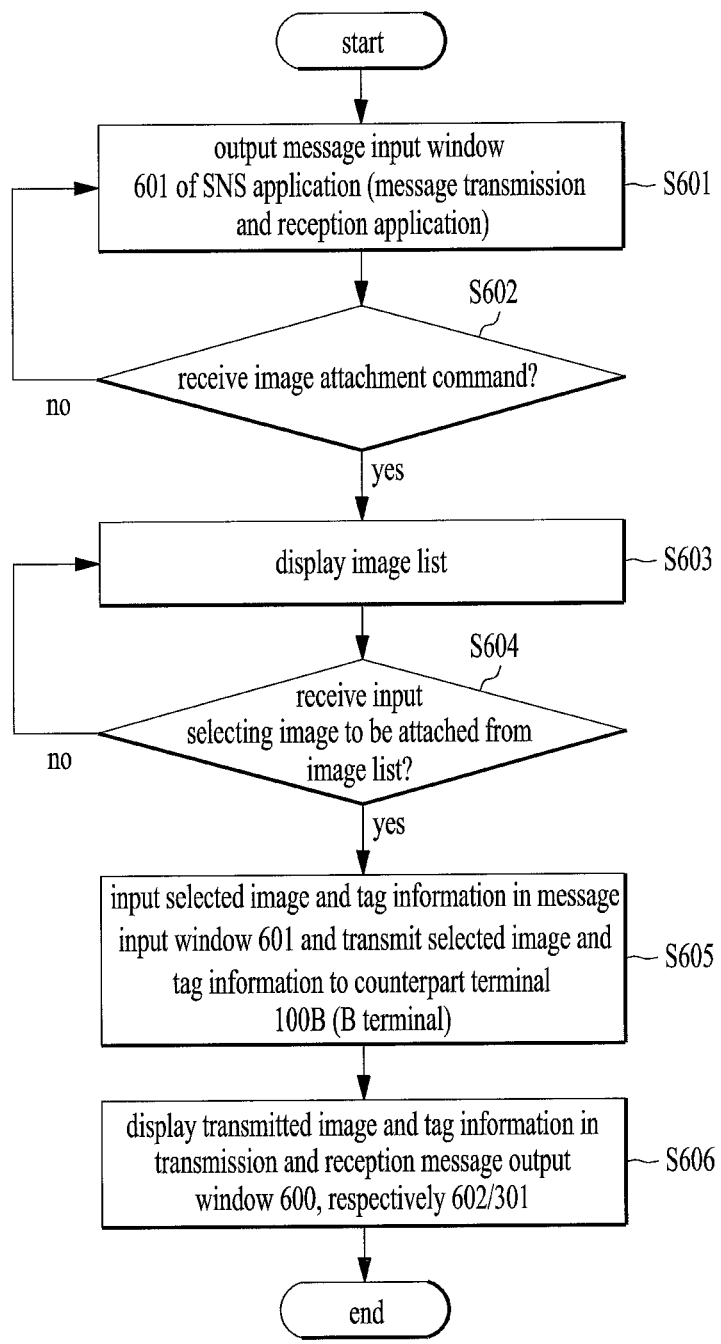
FIG. 6B is a flowchart for a control method attaching tag information and an image to a message to be transmitted in case of writing the message using an SNS application according to one embodiment of the present invention.

FIG. 6A is a diagram for a control method attaching tag information and an image to a message to be transmitted in case of writing the message using an SNS application according to one embodiment of the present invention. FIG. 6B is a flowchart for a control method attaching tag information and an image to a message to be transmitted in case of writing the message using an SNS application according to one embodiment of the present invention. In the following, the control method is explained with reference to FIG. 6A and FIG. 6B.

An SNS application is an application capable of sharing a sort of conversation or information with a different mobile terminal user. If a posting or a conversation written by a user is transmitted, a counterpart mobile terminal user can check the posting or the conversation.

In the following description and drawing used for explaining one embodiment of the present invention, in case of transmitting and receiving a message using an SNS application, a transmission mobile terminal and a reception mobile terminal are represented as A terminal 100A and B terminal 100B, respectively.

In the step S601, as shown in FIG. 6A (a), an A controller 180A of the A terminal 100A outputs a transmission and reception message output window 600 and a message input window 601 of an SNS application via an A touch screen 151A. In the step S602, the A controller 180A waits for a reception of an image attachment command from a user. If the image attachment command is received, it may proceed to the step S603. If the image attachment command is not received, it may return to the step S601. As shown in FIG. 6A (b), in the step S603, the A controller 180A can output an image list 601-1 to receive a selection of an image to be attached by the user. In the step S604, the A controller 180A waits for a reception of an input 10f that selects an image 602 to be attached from the outputted image list. If the input is not received, the A controller 180A may return to the step S603. If the input is received, the A controller may proceed to the step S605. In the step S605, the A controller 180A inputs the selected image 602 and tag information 301 to the message input window 601 and can transmit the image 602 and the tag information 301 to a counterpart terminal 100B (B terminal). In this case, the tag information 301 may correspond to tag information corresponding to the selected image 602. As shown in FIG. 6A (c), the transmitted image 602 and the tag information 301 are displayed on the transmission and reception message output window 600, respectively [S606].

Meanwhile, according to the embodiment explained with reference to FIG. 6A and FIG. 6B, an image and tag information stored in an A terminal 100A are transmitted to a B terminal 100B. One embodiment of the present invention proposes that the tag information transmitted to the B terminal 100B is modified by a user of the B terminal 100B and the modified tag information is updated in the A terminal 100A as well. Regarding this embodiment, it shall be described with reference to FIG. 7 in the following.

FIG. 7 is a diagram for a control method modifying received tag information by a mobile terminal, which has received the tag information, according to one embodiment of the present invention.

In the embodiment mentioned earlier with reference to FIG. 6A and FIG. 6B, assume that the transmitted image and the tag information are received by B terminal 100B shown in FIG. 7. In FIG. 7 (a), B controller 180B of the B terminal 100B outputs an image reading screen 602 in response to the image 602 received from the A terminal 100A. The B controller 180B can output the tag information 301 as well as the received image 602.

If a tag modification command 10g is received, as shown in FIG. 7 (b), the B controller 180B can output a tag input window 701 together with a pop-up window 700 guiding modification/addition of a tag. If an additional tag is inputted via a virtual keypad 702 and a confirm 701-1 icon is selected, the controller 180 updates the tag information 301 and the updated tag information can be transmitted back to the A terminal 100A.

Having received the updated tag information, the A terminal 100A can display a message 704 indicating the updated tag information in the transmission and reception message output window 600. Moreover, the A controller 180A can also display detail content 704-1 of the updated tag information in the transmission and reception message output window 600.

As mentioned in the foregoing description, the tag updated by the counterpart terminal (B terminal) 100B can also be seen in case of reading the updated tag using the A terminal 100A. A screen for reading the updated tag is explained in detail with reference to FIG. 8A and FIG. 8B in the following.

Figure 8A:
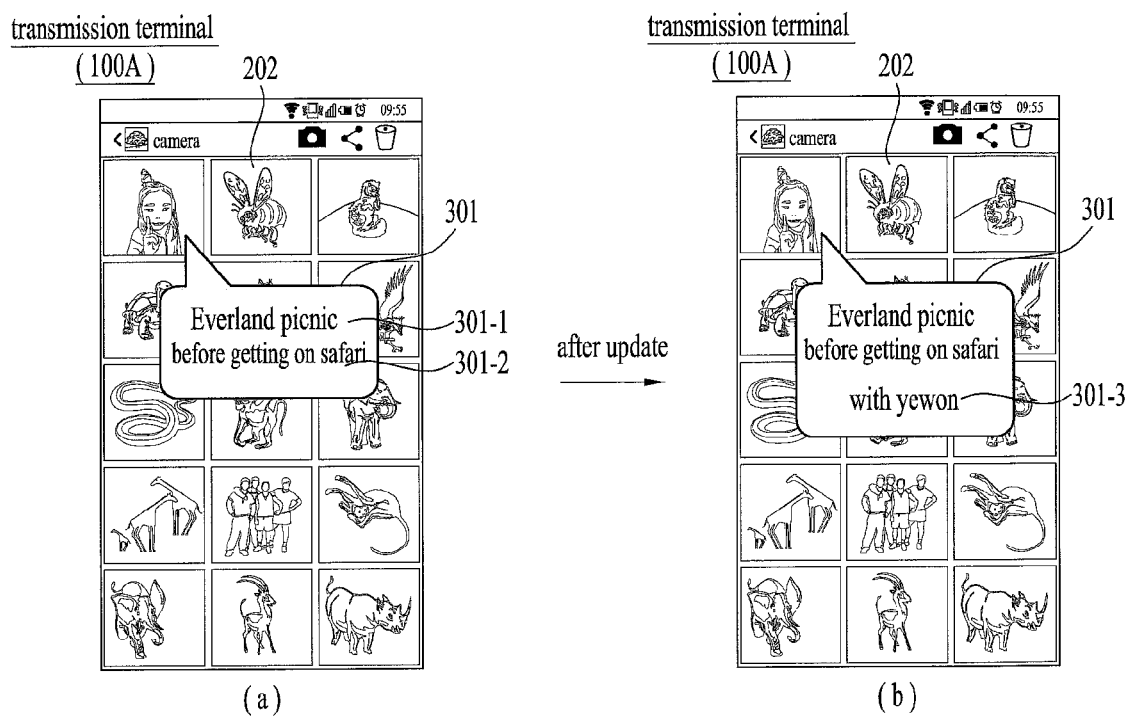
FIGS. 8A and 8B are diagrams for a screen on which a tag is outputted in case of updating tag information by a counterpart terminal according to one embodiment of the present invention.
Figure 8B:
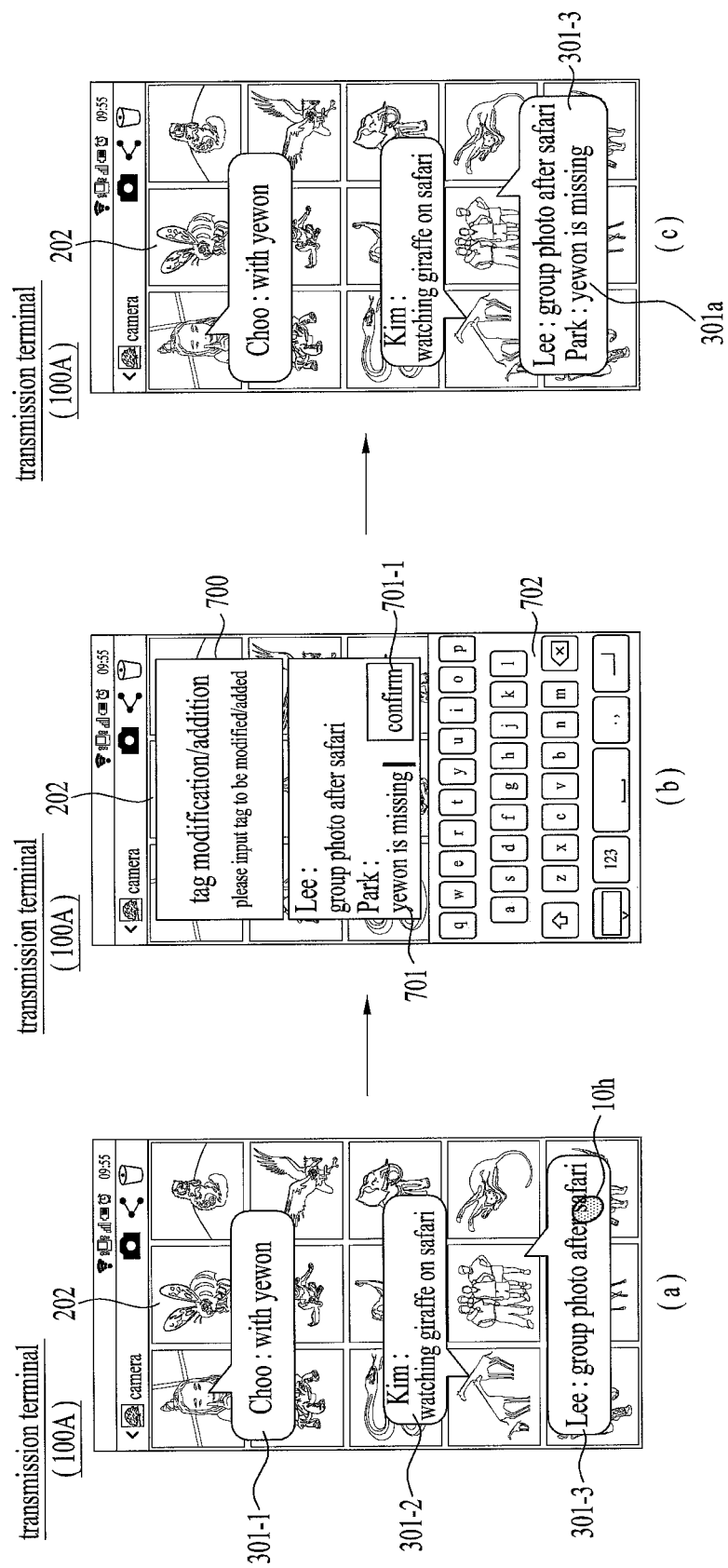

FIGS. 8A and 8B are diagrams for a screen on which a tag is outputted in case of updating tag information by a counterpart terminal according to one embodiment of the present invention.

FIG. 8A (a) shows tag information before the tag information is updated by the B terminal 100B and FIG. 8A (b) shows the tag information 301 displayed on an image list 202 after the tag information is updated. Referring to FIG. 8A (a), before the tag information is updated, the tag information 301 outputs 301-1 and 301-2 only. On the contrary, referring to FIG. 8A (b), 301-3 is added to the legacy tag information 301 after the tag information is updated.

Meanwhile, the tag information might be updated by a plurality of counterparts. In this case, it is necessary to identify a person who has updated the tag information. Hence, according to one embodiment of the present invention, if tag information is updated by a counterpart terminal, one embodiment of the present invention proposes to identify a counterpart terminal, which has updated the tag information, and display the identified counterpart terminal together with the tag information. The tag information is explained in detail with reference to FIG. 8B in the following.

Referring to FIG. 8B (a), an A terminal 100A displays an image list 202 and tag information 301-1 to 301-3 on each image is displayed on the image list 202. Meanwhile, each of the tag information 301-1 to 301-3 identifies a terminal, which has recorded the tag information, and displays the identified terminal together with the tag information. For instance, such a text message data as "with yewon" is recorded in a first tag information 301-1 and the text message data is recorded by a counterpart terminal such as "Choo". The A controller 180A identifies the counterpart terminal which has performed the recording and displays the identified result ("Choo") in the first tag information 301-1 together. A process of identifying the counterpart terminal can be performed in a manner of comparing a telephone number of the counterpart terminal with contact information stored in advance.

Moreover, one embodiment of the present invention proposes to modify or add the tag information 301-1 to 301-3 modified by the counterpart terminal. A process of modifying may be similar to the modification/addition process mentioned earlier in FIG. 7.

If a command 10h for modifying the third tag information 301-3 is received, as shown in FIG. 8B (b), the A controller 180A can output a pop-up window 700 guiding modification/addition of the tag. The A controller 180A outputs a tag input window 701 together with the pop-up window 700. If a text message data is inputted to the tag input window via a virtual keypad 702 and a confirm 701-1 icon is selected, the controller 180 can update the tag information 301 (refer to FIG. 8B (c)).

Meanwhile, according to aforementioned method, in case of updating tag information, a virtual keypad is used. On the contrary, in the following FIG. 9, it is proposed that tag information is immediately updated using a text message data received from a counterpart terminal.

Figure 9:
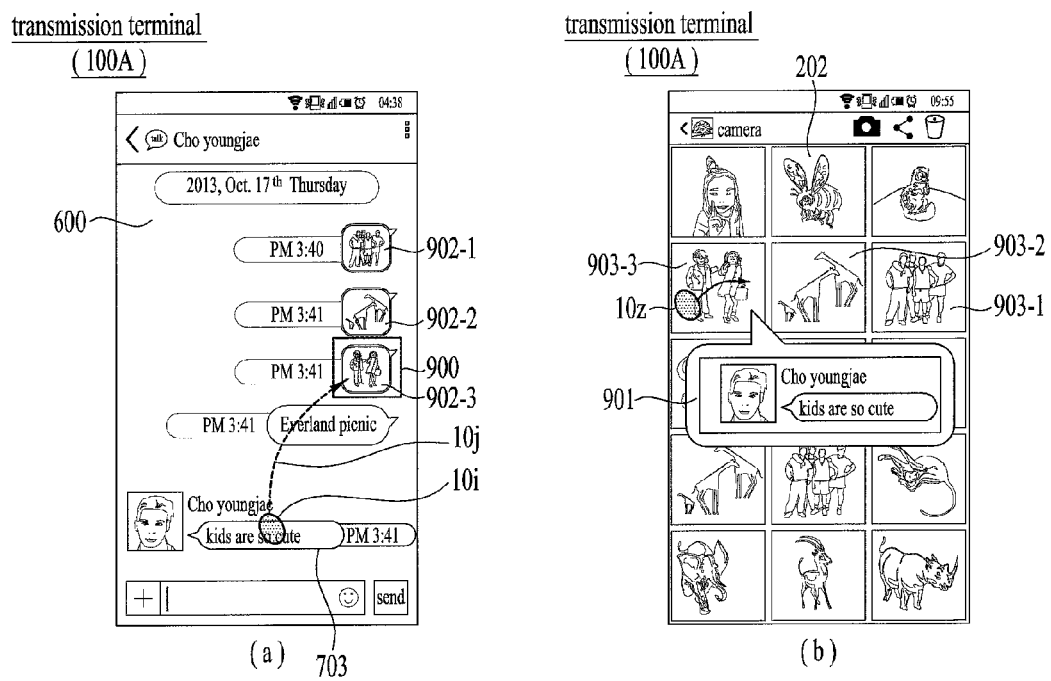
FIG. 9 is a diagram for a control method using a text message data included in a message received from a counterpart terminal in case of updating tag information of an image according to one embodiment of the present invention.

FIG. 9 is a diagram for a control method using a text message data included in a message received from a counterpart terminal in case of updating tag information of an image according to one embodiment of the present invention.

Referring to FIG. 9 (a), an A terminal 100A displays transmitted images 902-1 to 902-3 and a received message 703 via a transmission and reception message output window 600 of an SNS application.

If a tag update command, which uses the received message 703, is received, the A controller 180A updates tag information on a selected image using the received message 703. In this case, the update command may correspond to an input touching 10i the received message 703 which is outputted in the transmission and reception message output window 600, dragging 10j the touch to a third transmitted image 902-3 while the touch 10i is maintained and releasing the touch 10i. In this case, if the touch 10i is dragged and moved to a position of the third transmitted image 902-3, the A controller 180A may further display a selection indicator 900 indicating that the third transmitted image 902-3 is in a state of being selected.

FIG. 9 (b) is a diagram for the updated tag information 901 displayed on an image list 202. Referring to the image list 202, images respectively corresponding to the transmitted images 902-1 to 902-3 are displayed in the image list as a first to third thumbnail image 903-1 to 903-3.

If a tag display command, which is inputted on the third thumbnail image 903-3, is received, the A controller 180A can display the updated tag information on the image list 202. The tag display command may correspond to a touch drag input 10z inputted on the third thumbnail image 903-3.

Meanwhile, according to the aforementioned embodiment, the tag information on the third transmitted image 902-3 is updated only. Tag information on a plurality of images can be updated. A control method applying update to all of a plurality of the images at a time is described with reference to FIG. 10 in the following.

Figure 10:
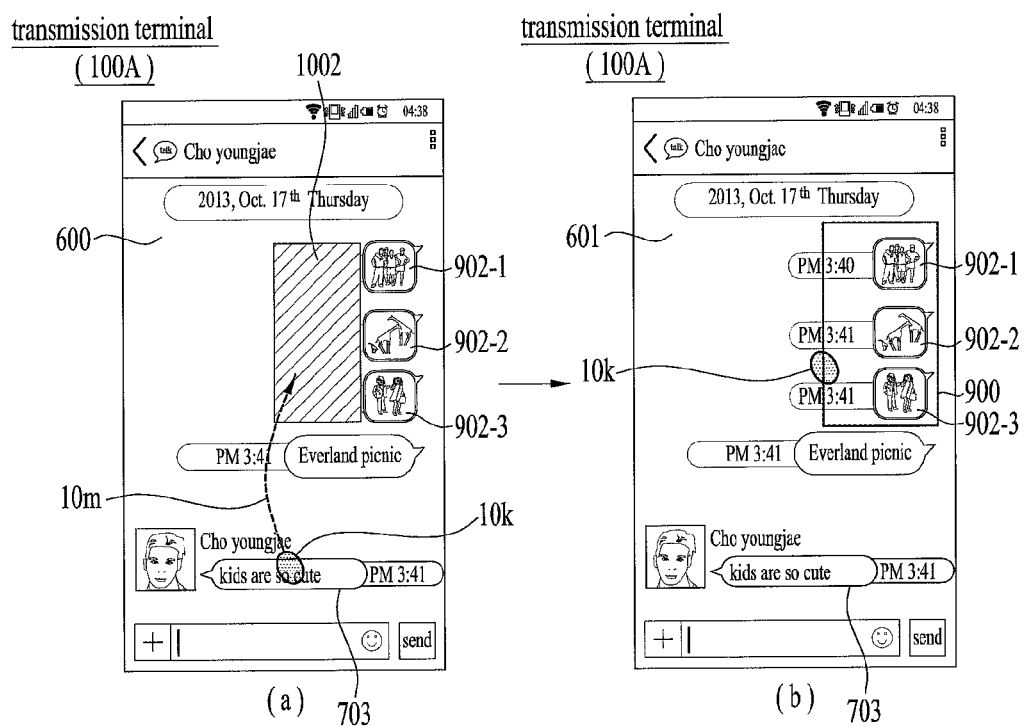
FIG. 10 is a diagram for a control method applying update to a plurality of transmitted images at a time in case of updating tag information for an image according to one embodiment of the present invention.

FIG. 10 is a diagram for a control method applying update to a plurality of transmitted images at a time in case of updating tag information of an image according to one embodiment of the present invention.

According to the embodiment mentioned earlier with reference to FIG. 9, a command for selecting a third transmitted image 902-3 corresponds to an input dragging a touch input to the third transmitted image 902-3 and releasing the touch. Meanwhile, the present embodiment proposes that a command for selecting a plurality of images at a time corresponds to an input dragging a touch input to an area adjacent to sequentially outputted transmitted images and releasing the touch. Referring to an example shown in FIG. 10, the area adjacent to the transmitted images corresponds to a left adjacent area 1002 of the outputted first to third transmitted image 902-1 to 902-3.

Referring to FIG. 10 (a), the first to the third transmitted image 902-1 to 902-3 and a received message 703 are outputted in a transmission and reception message output window 600. If a tag update command is received, an A controller 180A updates tag information on a selected image using the received message 703. In this case, the update command corresponds to an input touching 10k the received message 703 outputted in the transmission and reception message output window 600, dragging 10m the touch to a left adjacent area 1002 while the touch is maintained and releasing 10k the touch. In this case, the selected image may correspond to the first to the third transmitted image 902-1 to 902-3.

If the touch 10k is dragged to the left adjacent area 1002 while the touch is maintained, as shown in FIG. 10 (b), the controller 180 can display a selection indicator 900 indicating that the first to the third transmitted image 902-1 to 902-3 are selected.

Figure 11:
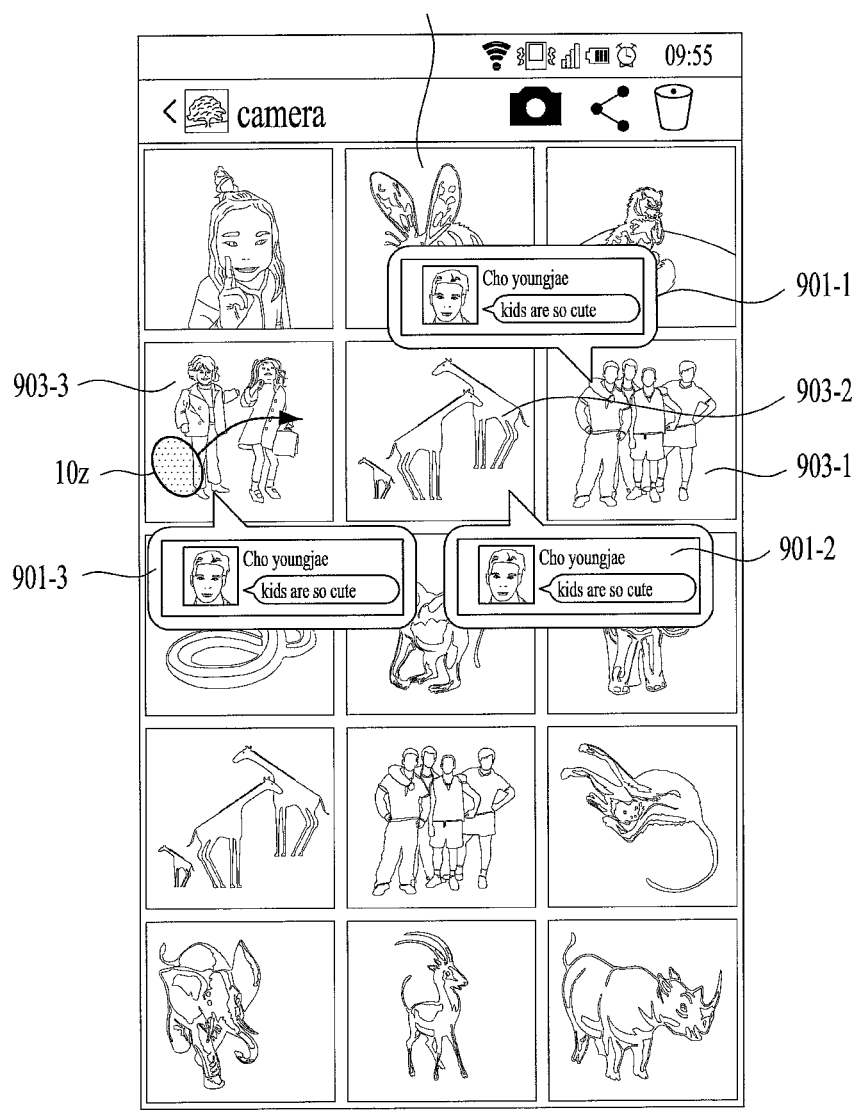
FIG. 11 is a diagram for an image list displaying update, which is applied to all of a plurality of transmitted images at a time, according to one embodiment of the present invention.

FIG. 11 is a diagram for an image list displaying update, which is applied to all of a plurality of transmitted images at a time, according to one embodiment of the present invention.

Referring to FIG. 11, an image list 202 is outputted and the first to the third transmitted image 902-1 to 902-3 described earlier in FIG. 10 are outputted on the image list 202.

The first to the third tag information 901-1 to 901-3 updated in FIG. 10 are displayed on the first to the third transmitted image 902-1 to 902-3, respectively, on the image list 202.

Meanwhile, in the embodiment mentioned earlier with reference to FIG. 10, a control method applying update of tag information to the first to the third transmitted image 902-1 to 902-3 at a time is introduced. Yet, instead of the update applied at a time, there may exist a necessity of updating tag information of an image selected by a user only. A control method capable of satisfying the necessity is explained with reference to FIG. 12 in the following.

Figure 12:
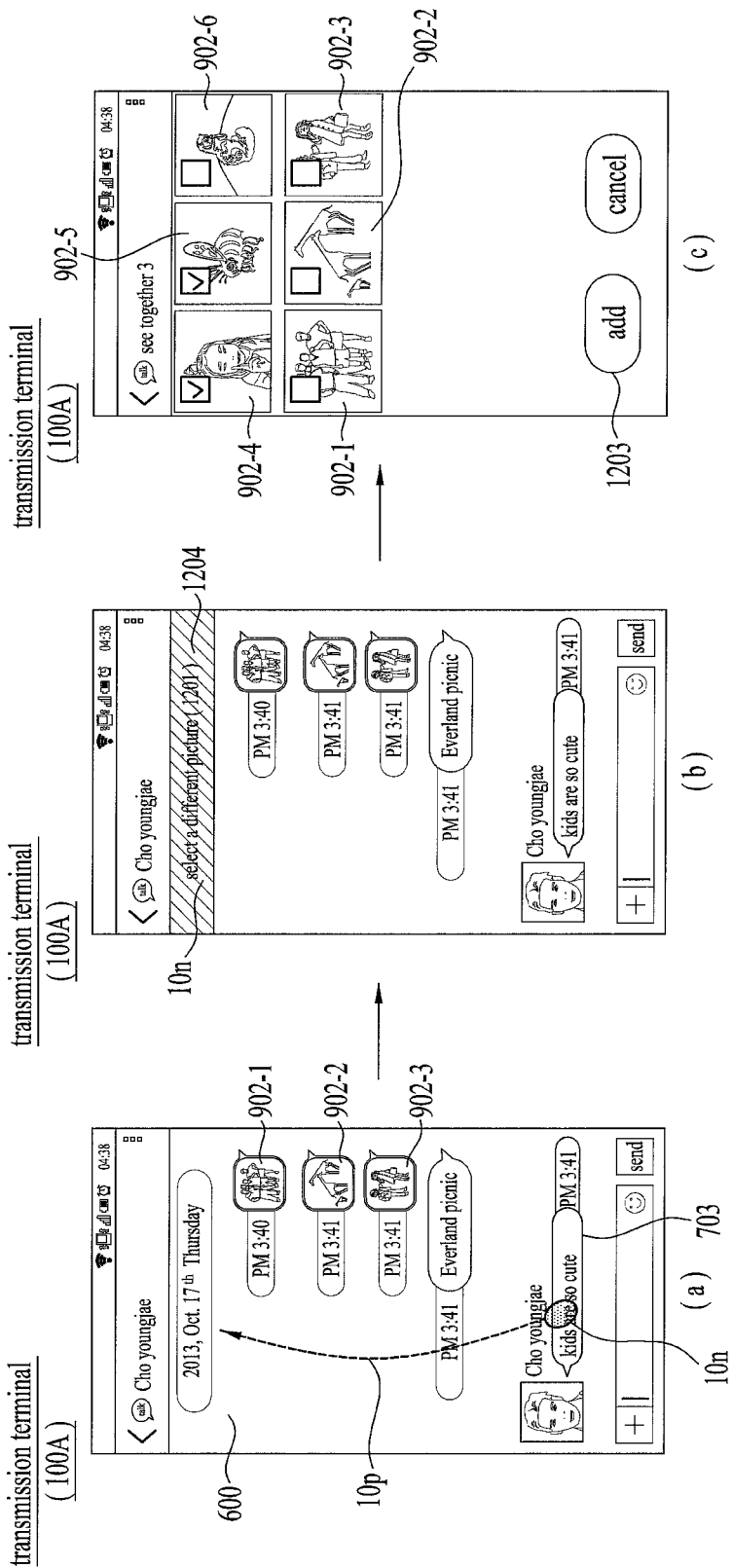
FIG. 12 is a diagram for a control method updating tag information of an image selected from a plurality of images by a user according to one embodiment of the present invention.

FIG. 12 is a diagram for a control method updating tag information of an image selected from a plurality of images by a user according to one embodiment of the present invention.

Referring to FIG. 12 (a), a first to a third transmitted image 902-1 to 902-3 and a received message 703 are outputted via a transmission and reception message output window 600. If a tag update command is received, as shown in FIG. 12 (c), the controller 180 can display an image list. The displayed image list may correspond to a list of images transmitted and received via an SNS application.

According to one embodiment of the present invention, the tag update command may correspond to an input touching 10n the received message 703 which is outputted in the transmission and reception message output window 600, dragging 10p the touch to a prescribed area 1201 while the touch 10n is maintained and releasing the touch 10n. The prescribed area 1201 may correspond to a top area of the transmission and reception message output window 600.

If the touch 10n is adjacent to the prescribed area 1201 by the dragging 10p, as shown in FIG. 12 (b), the controller 180 can output an area indicator 1204 indicating the prescribed area 1201.

Referring to the image list shown in FIG. 12 (c), each of image items included in the image list outputs a check box 1202 together. A plurality of images can be selected by a user by checking or unchecking the check box 1202. After a plurality of the images are selected by a user via the image list, if an add button 1203 is selected, the A controller 180A can update tag information on a plurality of the selected images using the received message 703.

Meanwhile, according to a different embodiment of the present invention, a control method capable of easily checking a posting, which is posted on an SNS application, related to a prescribed image in an image list is proposed. This embodiment is explained with reference to FIG. 13 in the following.

Figure 13:
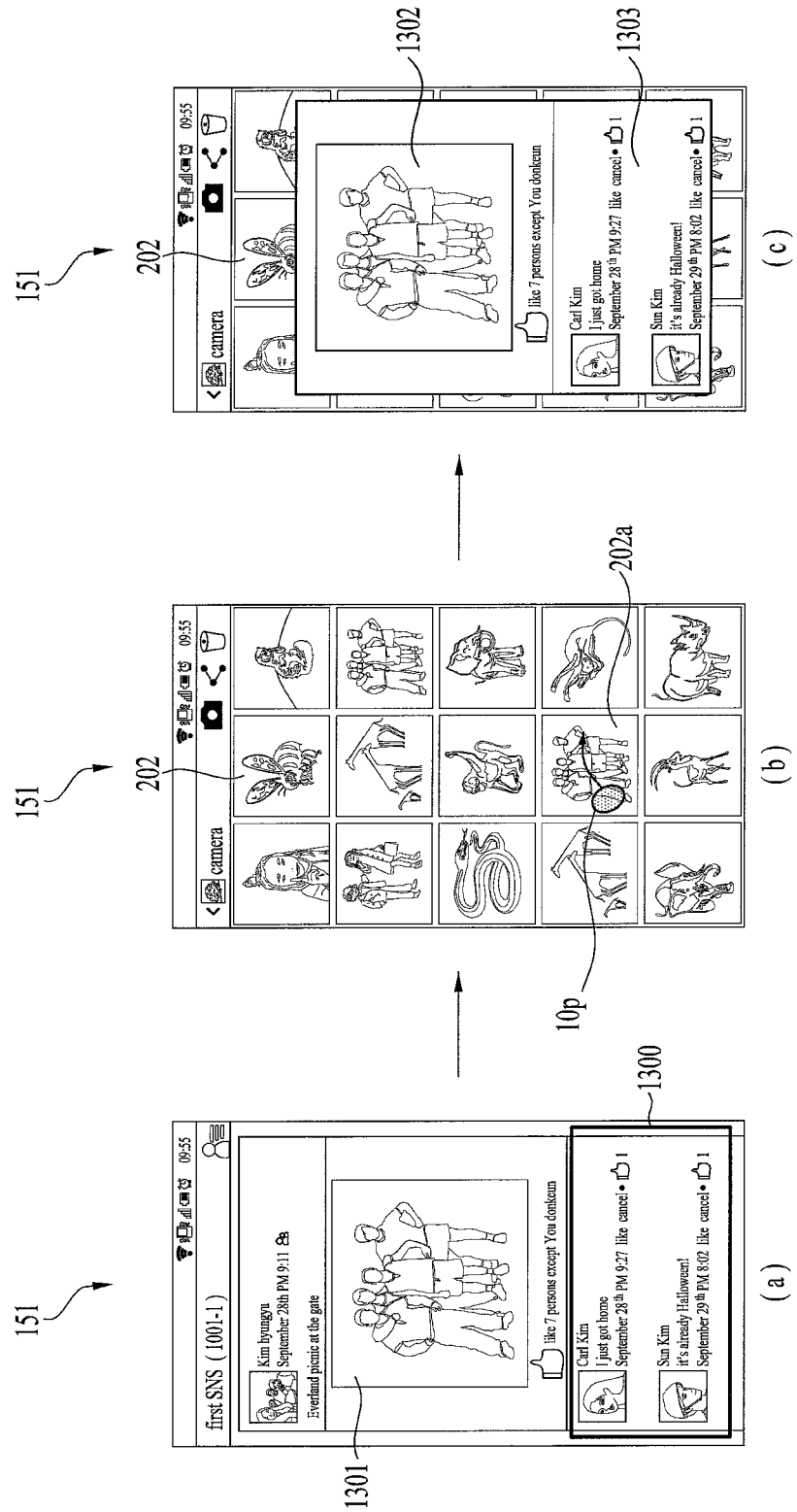
FIG. 13 is a diagram for a control method reading a posting of an SNS application, which is associated with a prescribed image, in an image list according to one embodiment of the present invention.

FIG. 13 is a diagram for a control method reading a posting of an SNS application, which is associated with a prescribed image, in an image list according to one embodiment of the present invention.

Referring to FIG. 13 (a), it shows an execution state of a first SNS application 1001-1. The application outputs a posting written together with a prescribed image 1301.

In general, an additional positing associated with an original posting can be made on an SNS application. In this case, an association means a relation capable of reading the additional posting in case of reading the original positing. In general, the additional posting is represented as a reply posting of the original posting.

Referring to FIG. 13 (a), a reply posting 1300 is displayed together with an original posting, which is written together with a prescribed image 1301. The reply posting 1300 can be written by a terminal identical to a terminal, which has written the original posting. Or, the reply posting can be written by a different terminal as well.

FIG. 13 (b) shows an image list 202 displayed on a gallery application of a mobile terminal 100. An image 202a included in the original posting written in FIG. 13 (a) is outputted on the image list 202.

If a prescribed command 10p is received on the image 202a, as shown in FIG. 13 (c), the controller 180 can display a posting 1303, which is posted on an SNS application, associated with the image 202a in response to the prescribed command 10p. And, the controller can output the image 202a together with the posting 1303. Meanwhile, the posting 1302, which is posted on an SNS application, associated with the image 202a may correspond to the reply posting 1300. This is because, since an original posting corresponds to a posting written by a user of a corresponding terminal, it is not necessary to check the posting in the image list 202, whereas a reply posting corresponds to a posting updated by a different user.

In particular, according to the embodiment explained with reference to FIG. 13, a user of a mobile terminal 100 is able to easily read a posting posted on an SNS application on an image list 202.

In the aforementioned embodiment, although an example of a single SNS application is explained, the embodiment can be identically applied to a plurality of SNS applications as well.

Meanwhile, in case of writing a posting on the aforementioned SNS application, a control method enabling a user to more easily write a posting is explained with reference to FIG. 14 in the following.

Figure 14:
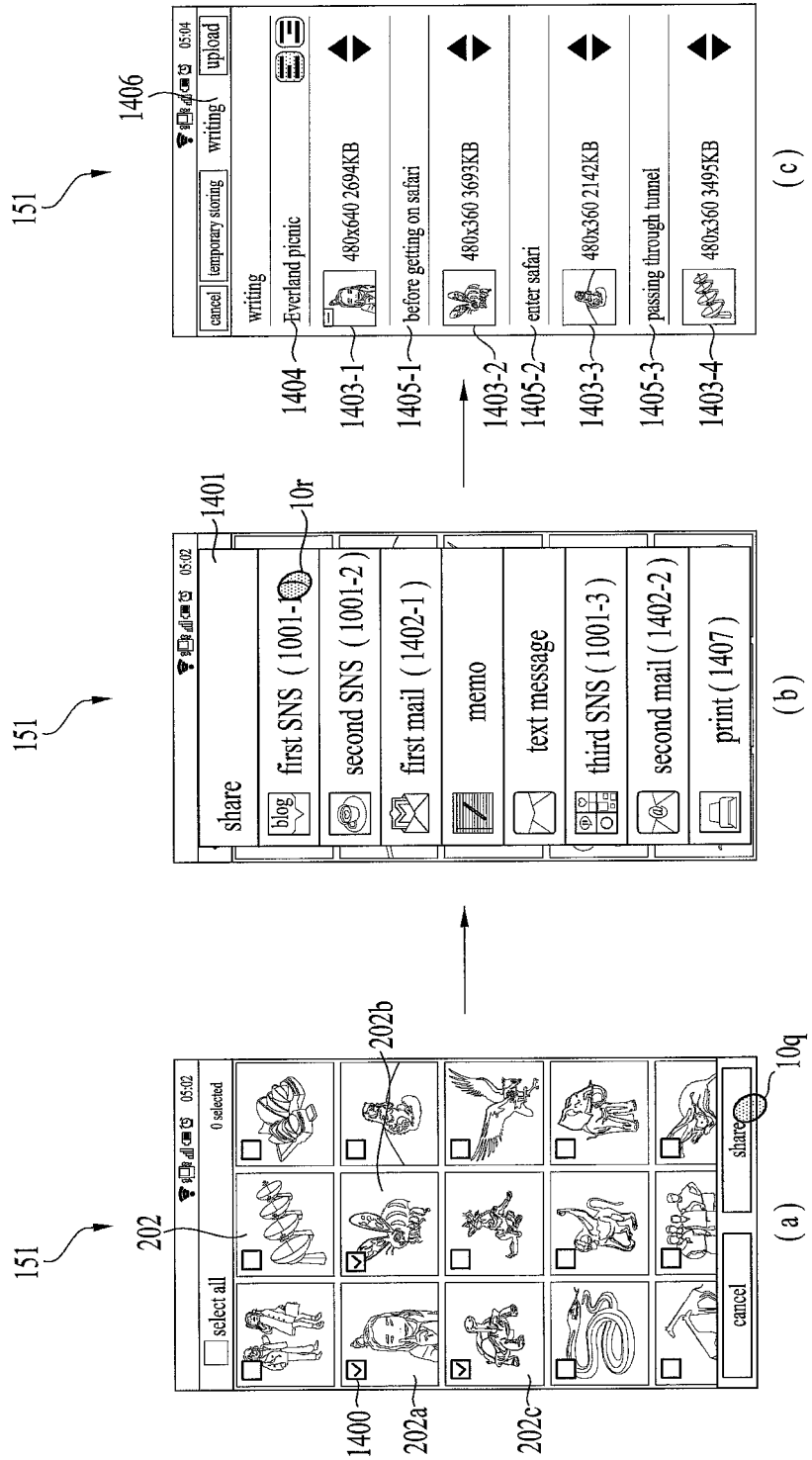
FIG. 14 is a diagram for a control method adding tag information of an attached image together in case of attaching an image to a posting of an SNS application according to one embodiment of the present invention.

FIG. 14 is a diagram for a control method adding tag information of an attached image together in case of attaching an image to a posting of an SNS application according to one embodiment of the present invention.

Referring to FIG. 14 (a), the controller 180 outputs an image list 202 and each of image items included in the image list outputs a check box. If at least one or more images are selected via the check box and a share command 10q is received, as shown in FIG. 14 (b), the controller outputs a list 1401 of applications to share the selected at least one or more images.

The application list 1401 includes a first to a third SNS application 1001-1 to 1001-3, a memo application, a text message application and the like.

If an input selecting the first SNS application 1001-1 from the application list 1401 is received, the controller 180 may write a posting of the first SNS application 1001-1 to which the selected at least one or more images are attached (refer to FIG. 14 (c)). According to one embodiment of the present invention, tag information of the selected at least one or more images can be further inputted to the posting.

FIG. 14 (c) shows a state 1406 of a posting written on the first SNS application. As shown in FIG. 14 (c), the controller 180 attaches the selected images (a first to a fourth image 1403-1 to 1403-4) to the posting. Moreover, the controller can further input first to third tag information 1405-1 to 1405-3 respectively corresponding to the first to the third image 1403-1 to 1403-3 to the posting.

If a tag of a prescribed item is common in the first to the fourth image 1403-1 to 1403-4, the common tag can be configured as a title 1404 of the posting. For instance, among the tag information of the first to the fourth image 1403-1 to 1403-4, if a title item corresponds to 'Everland picnic', the controller 180 can input such a title as 'Everland picnic' to the posting.

Meanwhile, tag information according to one embodiment of the present invention can be controlled to be printed when an image is printed. Regarding this embodiment, it shall be described with reference to FIG. 15 in the following.

Figure 15:
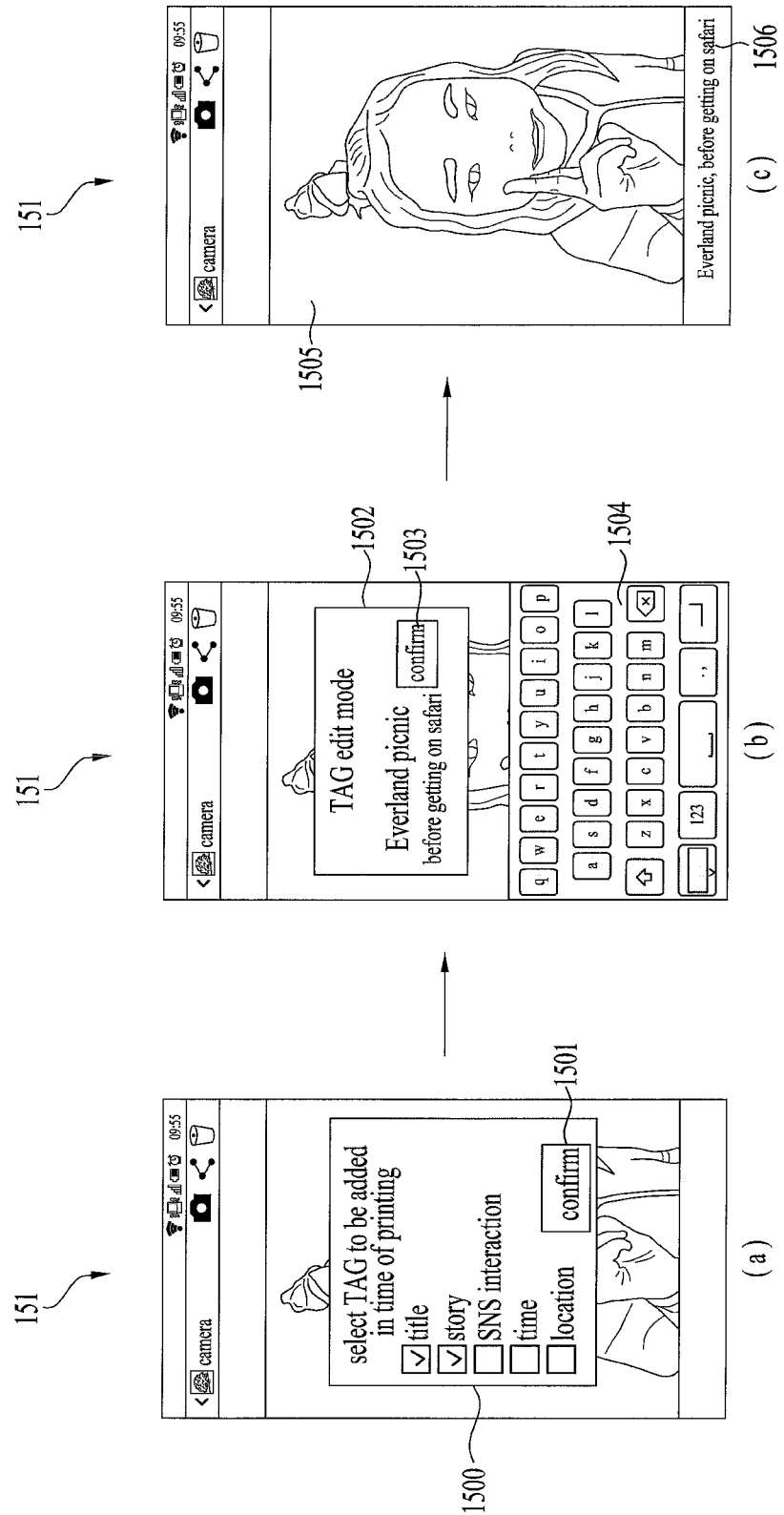
FIG. 15 is a diagram for a control method printing tag information together with an image in case of receiving a print command according to one embodiment of the present invention.

FIG. 15 is a diagram for a control method printing tag information together with an image in case of receiving a print command according to one embodiment of the present invention.

FIG. 15 (a) is a diagram for a state of preparing to print in response to a print command for a prescribed image. In the state of preparing to print, a tag selection pop-up window 1500 used for selecting tag information, which is printed together with an image, can be outputted. If the tag information consists of a plurality of items, the tag selection pop-up window 1500 can include a list containing a plurality of the items and check boxes corresponding to a plurality of the items. If a user selects the check boxes and selects a confirm icon 1501, the controller 180 can output a tag edit pop-up window 1502. If editing of a tag is received via a virtual keypad 1504 and a confirm icon 1503 is selected, the controller 180 can output a print preview screen 1505 shown in FIG. 15 (c). Referring to the print preview screen 1505, it is able to see that an image and a tag 1506 are displayed together.

Meanwhile, one embodiment of the present invention proposes to input tag information in response to timing of playback of a video. Regarding this embodiment, it shall be described with reference to FIG. 16 in the following.

Figure 16:
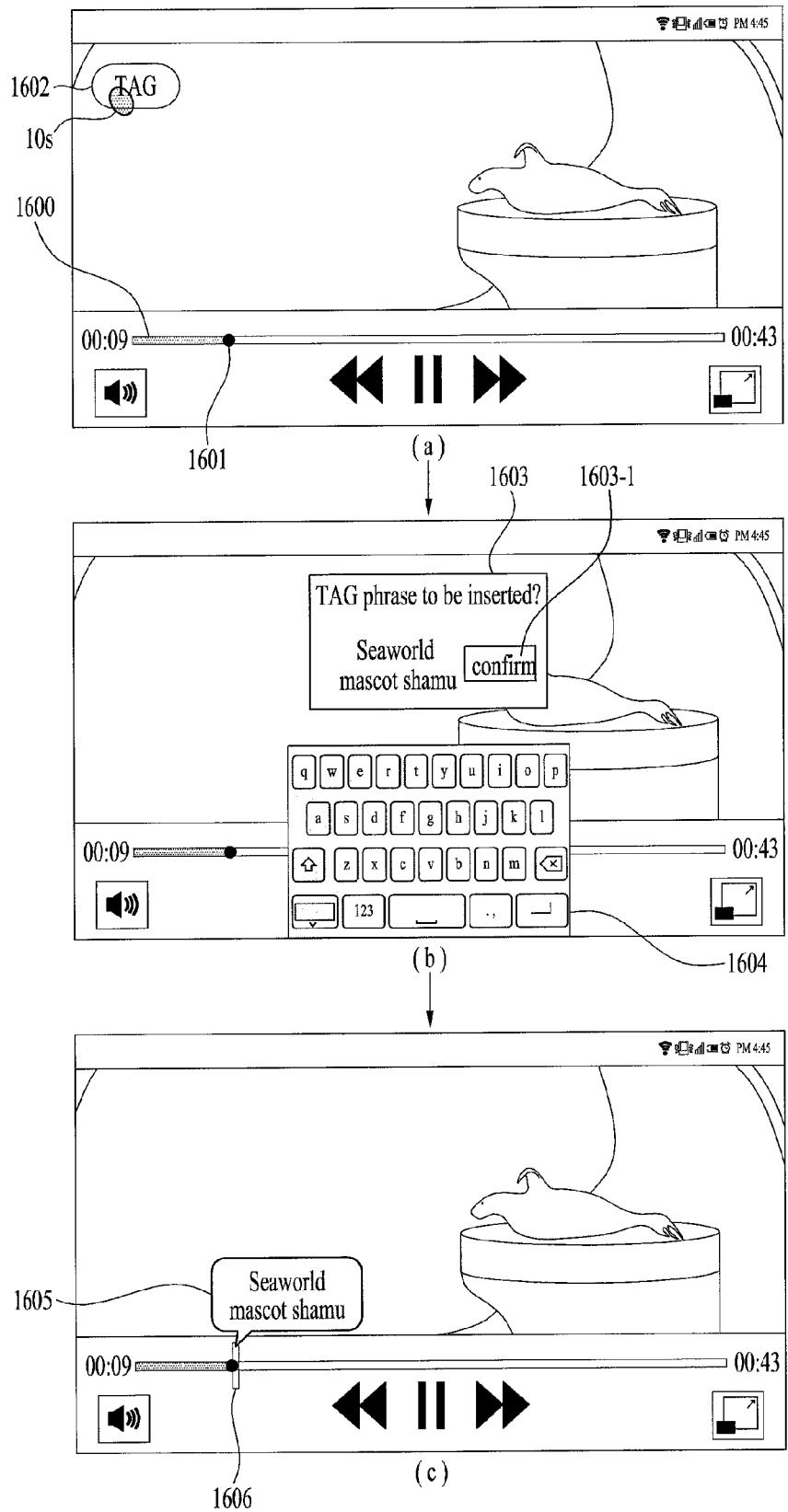
FIG. 16 is a diagram for a control method inputting tag information in response to a prescribed timing of video playback according to one embodiment of the present invention.

FIG. 16 is a diagram for a control method inputting tag information in response to a prescribed timing of video playback according to one embodiment of the present invention.

FIG. 16 (a) shows a state of playing a video. It includes a progressive bar 1600 and a playback timing indicator 1601. According to one embodiment of the present invention, it is proposed that the controller 180 further outputs a tag input button 1602 in the playback state. If an input selecting the tag input button 1602 is received in the middle of playing a video, the controller 180 can output a tag input pop-up window 1603. If a text message data is inputted via a virtual keypad 1604 and a confirm icon 1603-1 is selected, the controller 180 can store tag information in response to the playback timing.

The controller 180 can output the tag information while the video is playing. In more particular, the controller can output the tag information 1605 at a corresponding point 1606 of the progressive bar 1600 which is outputted in the playback state of the video.

According to one embodiment of the present invention, the tag information, which is inputted in the middle of playing the video, can be checked in an image list. Regarding this embodiment, it shall be described with reference to FIG. 17 in the following.

Figure 17:
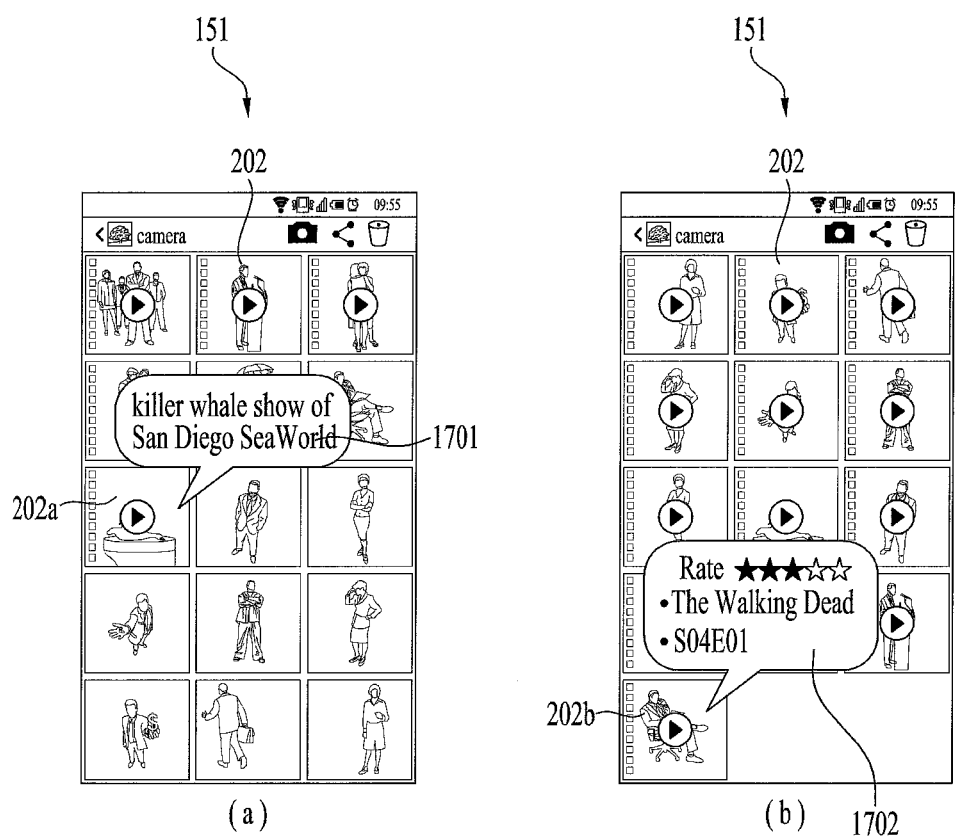
FIG. 17 is a diagram for a control method outputting tag information corresponding to a video on an image list according to one embodiment of the present invention.

FIG. 17 is a diagram for a control method outputting tag information corresponding to a video in an image list according to one embodiment of the present invention.

Referring to FIG. 17 (a), the controller 180 outputs an image list 202. The controller 180 outputs tag information 1701, which is inputted in response to a prescribed point of a video, together with the outputted image list 202. The outputted tag information 1701 can be displayed on a thumbnail image 202a of the video in the image list 202.

Moreover, one embodiment of the present invention proposes to search for information on a video on the web and display a searched result on the image list 202. Referring to FIG. 17 (b), the controller outputs the image list 202 and searches for information on a prescribed video on the web on the outputted image list 202. If there exists a searched result, the controller 180 stores the searched result as tag information and may be then able to output the stored tag information 1702 on the image list 202 (refer to FIG. 17 (b)). In this case, the outputted tag information 1702 can be displayed on a thumbnail image 202b of the prescribed video.

It may be cumbersome for a user to input tag information to each of many images. Hence, one embodiment of the present invention proposes to automatically input tag information to a plurality of captured images using the tag information inputted in a step of capturing a plurality of the images. Regarding this embodiment, it shall be described with reference to FIG. 18 in the following.

Figure 18:
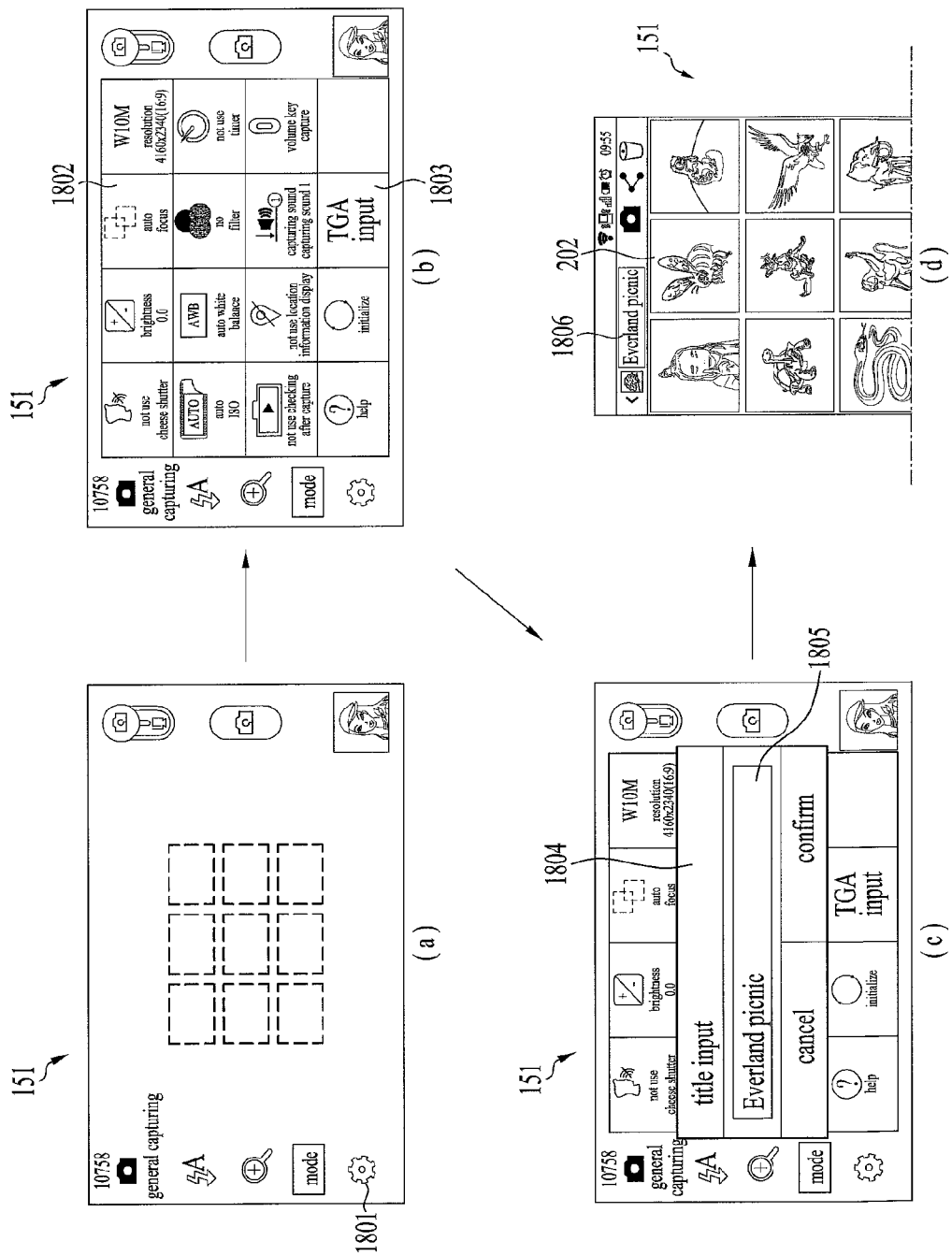
FIG. 18 is a diagram for a control method inputting tag information in a step of capturing an image according to one embodiment of the present invention.

FIG. 18 is a diagram for a control method inputting tag information in a step of capturing an image according to one embodiment of the present invention.

Referring to FIG. 18 (a), the controller 180 shows an image capturing state. The image capturing state includes a capture setting button 1801. If the capture setting button 1801 is selected, as shown in FIG. 18 (b), the controller 180 can output a capturing menu 1802, which is applicable in case of capturing an image. One embodiment of the present invention proposes the capturing menu 1802 to include a tag input item 1803 to input a tag.

If the tag input item 1803 is selected, as shown in FIG. 18 (c), the controller 180 outputs a tag input pop-up window 1804. The tag input pop-up window 1804 outputs a tag input window 1805. If a prescribed tag is inputted via the tag input window 1805 and a store button is selected, the controller 180 can store an image to be captured together with the inputted tag. Referring to FIG. 18 (d), an image list 202 of images commonly including the tag information inputted in FIG. 18 (c) is outputted. Such a common tag information 1806 as 'Everland picnic' is set to the image list 202.

According to the embodiment mentioned earlier with reference to FIG. 18, if a plurality of images are captured with a common theme, it is not necessary for a user to repeatedly input a common tag to a plurality of the captured and stored images.

Meanwhile, one embodiment of the present invention intends to provide a control method capable of reading postings related to a prescribed image at a time using a plurality of SNS applications. Regarding this embodiment, it shall be described with reference to FIG. 19 to FIG. 21B in the following.

FIGS. 19 and 20 are diagrams for a control method interworking a posting of an SNS application related to an image according to one embodiment of the present invention.

One embodiment of the present invention proposes a common theme image view 1900 capable of separately reading a plurality of images including a common tag information. For instance, referring to an example shown in FIG. 19, the controller 180 filters a plurality of images including such a common tag information as 'Everland picnic' and outputs a result of the filtering to a user as shown in FIG. 19 (a). As a result of filtering, the controller 180 can output a first to a fifth image 1901-1 to 1901-5 including such a tag information as 'Everland picnic'.

Moreover, one embodiment of the present invention proposes to receive posting information related to each image from a plurality of SNS applications interworked with a mobile terminal and provide the information to a user.

Assume that a first image 1901-1 outputted on the common theme view 1900 shown in FIG. 19 (a) is interworked with a first and a second SNS application. The controller 180 outputs a first and a second SNS icon 1901a/1901b together with the first image 1901-1. By doing so, the controller is able to guide a type of interworking SNS applications to a user. Moreover, if an input selecting an image/posting view icon 1901c is received, as shown in FIG. 19 (b), the controller 180 can output an image/posting view screen 1902.

The image/posting view screen 1902 outputs postings of SNS applications interworked with the first image together with the first image 1901-1. Referring to FIG. 19 (b), the image/posting view screen 1902 includes a first posting 1902a interworked via a first SNS application and a second posting 1902b interworked via a second SNS application. Switching between the first image and the second image can be performed by a scroll input of a user (refer to FIG. 19 (c)). If the first image is switched to the second image 1902-2 by the scroll input of the user, as shown in FIG. 19 (c), the controller 180 can output a third posting 1903 corresponding to the second image 1902-2.

A different control method reading a posting is explained with reference to FIG. 20 in the following.

Referring to FIG. 20 (a), the controller 180 outputs a common theme image view 1900. If a posting view command is received on a first SNS icon 1901a, the controller 180 can output a posting output pop-up window 2001 in a position of the first SNS icon 1901a. The posting view command may correspond to an input 10t touching the first SNS icon 1901a for more than a prescribed time.

The posting output pop-up window 2001 can output postings 2001-1/2001-2 related to the first image 1901-1 only among postings posted via the first SNS application.

Meanwhile, the controller provides a control method deleting the postings 2001-1/2001-2 outputted on the posting output pop-up window 2001. In particular, the controller can stop outputting the first posting 2001-1 in response to a prescribed command inputted on the posting output pop-up window 2001 (refer to FIG. 20 (c)). As an example of the prescribed command, the prescribed command may correspond to a touch drag 10u input performed on the first posting 2001-1.

Figure 21A:
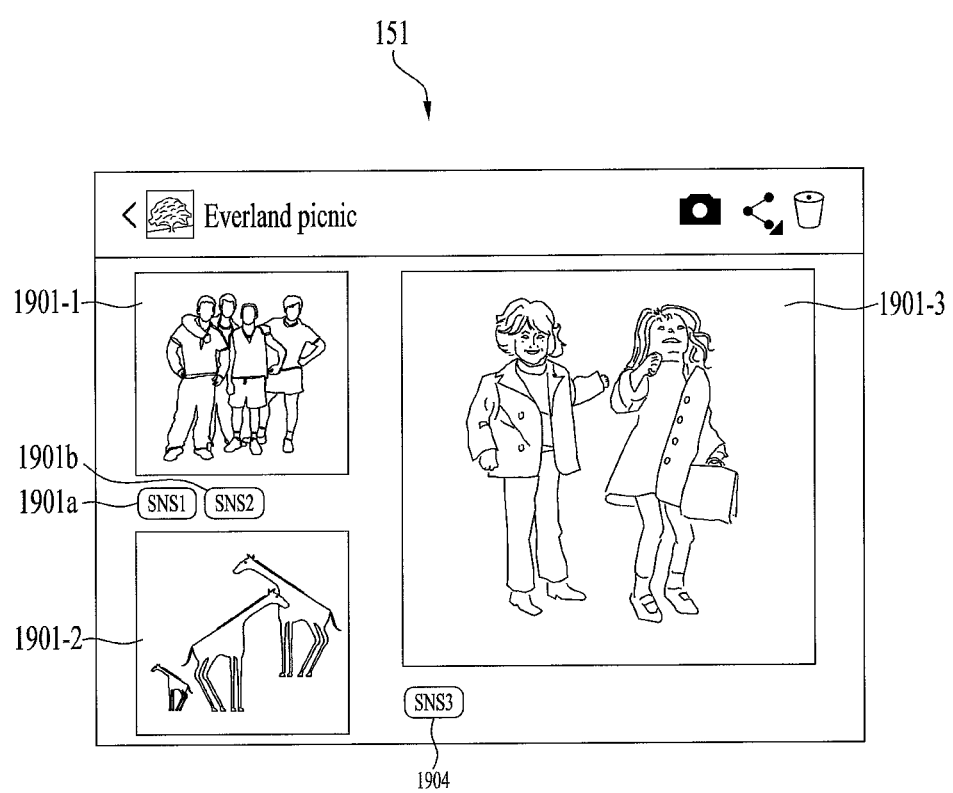
FIGS. 21A and 21B are diagrams for a different example of a common theme image view 1900.
Figure 21B:
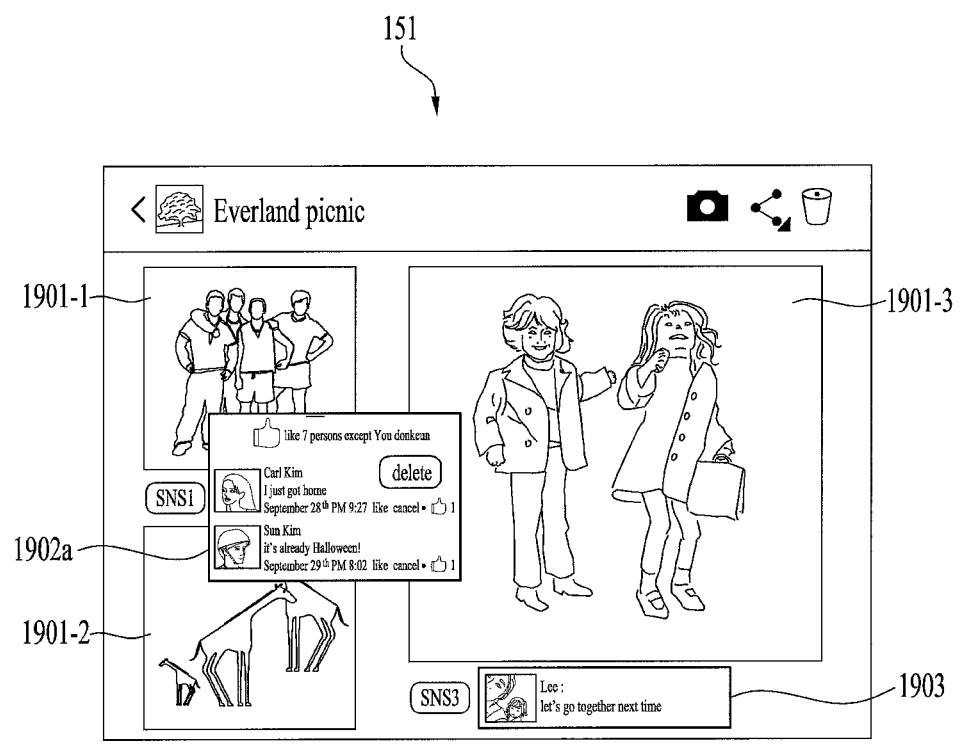

FIGS. 21A and 22b are diagrams for a different example of a common theme image view 1900. In FIG. 21A and FIG. 21B, the common theme image view changes a position on which an image is outputted and a size of the image.

FIGS. 21A and 21B are diagram for a state of a common theme image view according to one embodiment of the present invention.

Referring to FIG. 21A, a first to a third image 1901-1 to 1901-3 including such a common tag information as 'Everland picnic' are outputted. And, SNS icons 1901a/1901b/1901c respectively corresponding to the images are outputted.

A user can easily read images, which are captured based on a single theme, while reading images including a common tag information at a time. In more particular, if a posting written for an image is interworked via an SNS application, user convenience can be enhanced compared to a control method providing an image only.

If a posting display command is received, as shown in FIG. 21B, the controller 180 can further display postings 1902a/1903 interworked with SNS applications.

Figure 22:
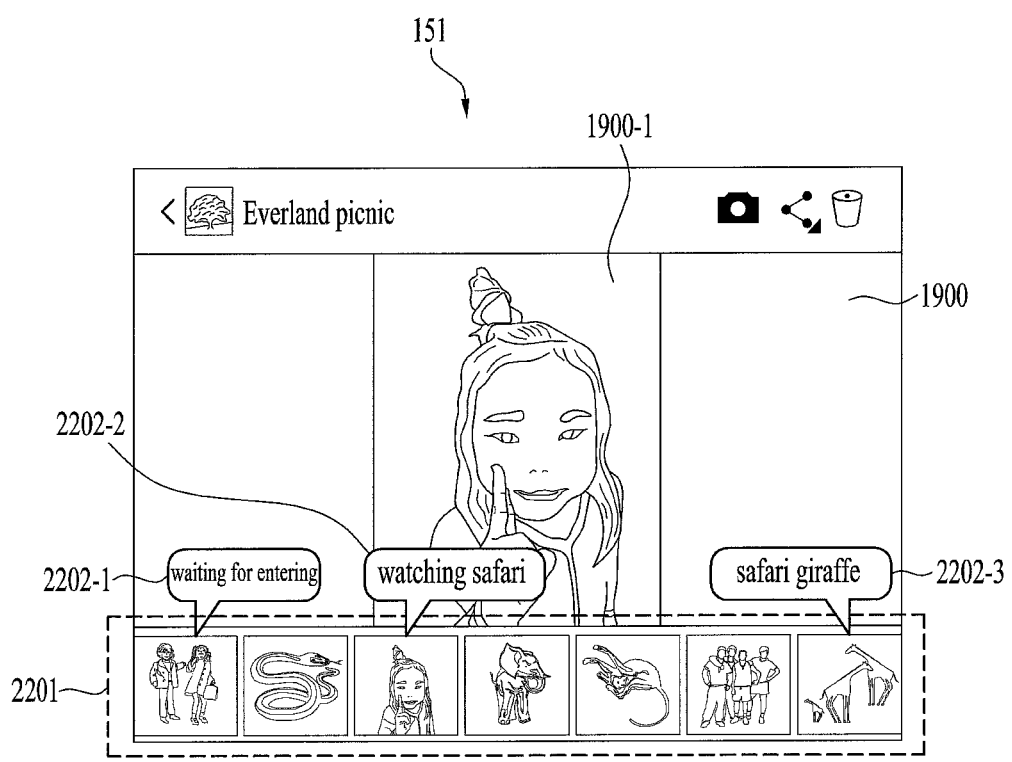
FIG. 22 is a diagram for a further different example of a common theme image view 1900 according to one embodiment of the present invention.

FIG. 22 is a diagram for a further different example of a common theme image view 1900 according to one embodiment of the present invention.

In an example shown in FIG. 22, a common theme image view 1900 is used to read images including such a common theme as 'Everland'. Referring to FIG. 22, the controller 180 outputs a first image 1901-1 among a plurality of images including a common tag information and may be able to switch the first image to a different image in response to a scroll input of a user.

The controller 180 according to one embodiment of the present invention outputs an image list 2201 including thumbnail images corresponding to a plurality of the images including the common tag information together with the first image 1901-1. And, the controller 180 can output tag information 2202-1 to 2201-3 on each of the thumbnail images included in the image list 2201.

Advantages and effects of a mobile terminal according to the present invention and a method of controlling therefor are explained in the following.

According to at least one of embodiments of the present invention, it is able to easily and efficiently share an image with a different mobile terminal.

And, according to at least one of embodiments of the present invention, it is able to provide a user with a control method capable of reading postings posted on SNS (social network service) applications related to a prescribed image at a time.

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a wireless communication device to wirelessly communicate with a counterpart terminal;
a touch screen;
a memory configured to store at least one or more images and tag information corresponding to the at least one or more images; and
a controller configured to execute a message transmission and reception application capable of transceiving data with the counterpart terminal, the controller configured to control the touch screen to display a message input window used for inputting a message via the message transmission and reception application, and in response to receiving an image attachment command with respect to a prescribed image, the controller is configured to input tag information corresponding to the prescribed image to the message input window,
wherein when the image attachment command is received with respect to the prescribed image, the controller is configured to control the wireless communication device to transmit, to the counterpart terminal, the prescribed image and the tag information corresponding to the prescribed image, and
wherein in response to receiving, from the counterpart terminal, update information to change the transmitted tag information, the controller is configured to change the stored tag information based on the received update information.

2. The mobile terminal of claim 1, wherein the controller is configured to control the touch screen to display a transmission and reception message output window to display transmitted and received messages and configured to display the transmitted tag information in the transmission and reception message output window.

3. The mobile terminal of claim 2, wherein the controller is configured to further display a thumbnail image corresponding to the transmitted image in the transmission and reception message output window.

4. The mobile terminal of claim 1, wherein the controller is configured to control the touch screen to display an image list that includes thumbnail images respectively corresponding to the at least one or more images stored in the memory, and wherein in response to receiving a tag output command with regard to a prescribed image, the controller is configured to display, at the image list, tag information corresponding to the prescribed image.

5. The mobile terminal of claim 1, wherein the tag information includes at least one item selected from the group consisting of a tide, a memo, a time and a location.

6. The mobile terminal of claim 1, wherein the controller is configured to control the touch screen to display a transmission and reception message output window to display transmitted and received messages, and wherein in response to receiving a prescribed touch gesture at a received message displayed in the transmission and reception message output window, the controller is configured to store the received message as tag information corresponding to a prescribed image.

7. The mobile terminal of claim 6, wherein the prescribed touch gesture corresponds to an input touching the received message displayed in the transmission and reception message output window, dragging the received message to a prescribed image displayed in the transmission and reception message output window while the touch is maintained and dropping the received message corresponding to the prescribed image.

8. A method of controlling a mobile terminal that includes a touch screen and a memory configured to store at least one or more images and tag information corresponding to the at least one or more images, the method comprising:
    executing a message transmission and reception application capable of transceiving data with a counterpart terminal;
    controlling the touch screen to display a message input window used for inputting a message via the message transmission and reception application; and
    in response to receiving an image attachment command with respect to a prescribed image, inputting tag information corresponding to the prescribed image to the message input window,
    wherein when the image attachment command is received with respect to the prescribed image, the mobile terminal to transmit, to the counterpart terminal, the prescribed image and the tag information corresponding to the prescribed image, and
    wherein in response to receiving, from the counterpart terminal, update information to change the transmitted tag information, changing the stored tag information based on the received update information.

9. The method of claim 8, wherein controlling the touch screen includes:
    displaying a transmission and reception message output window to display transmitted and received messages; and
    displaying the transmitted tag information in the transmission and reception message output window.

10. The method of claim 9, wherein controlling the touch screen further includes displaying a thumbnail image corresponding to the transmitted image in the transmission and reception message output window.

11. The method of claim 8, wherein controlling the touch screen includes:
    displaying an image list that includes thumbnail images respectively corresponding to the at least one or more images stored in the memory; and
    in response to receiving a tag output command with regard to a prescribed image, displaying, at the image list, tag information corresponding to the prescribed image.

12. The method of claim 8, wherein the tag information includes at least one item selected from the group consisting of a title, a memo, a time and a location.

13. The method of claim 8, wherein controlling the touch screen includes:
    displaying a transmission and reception message output window to display transmitted and received messages; and
    in response to receiving a prescribed touch gesture at a received message displayed in the transmission and reception message output window, storing the received message as tag information corresponding to a prescribed image.

14. The method of claim 13, wherein the prescribed touch gesture corresponds to an input touching the received message displayed in the transmission and reception message output window, dragging the received message to a prescribed image displayed in the transmission and reception message output window while the touch is maintained and dropping the received message corresponding to the prescribed image.

* * * * *